US009621097B2

(12) United States Patent
Takagi

(10) Patent No.: US 9,621,097 B2
(45) Date of Patent: Apr. 11, 2017

(54) LINEAR CONVEYOR, CONVEYANCE CARRIAGE, AND DRIVE CONTROL METHOD FOR LINEAR CONVEYOR

(71) Applicant: YAMAHA HATSUDOKI KABUSHIKI KAISHA, Shizuoka-ken (JP)

(72) Inventor: Katsuyuki Takagi, Shizuoka-ken (JP)

(73) Assignee: YAMAHA HATSUDOKI KABUSHIKI KAISHA, Shizuoka-ken (JP)

(*) Notice: Subject to any disclaimer, the term of this patent is extended or adjusted under 35 U.S.C. 154(b) by 124 days.

(21) Appl. No.: 14/356,541

(22) PCT Filed: Oct. 5, 2012

(86) PCT No.: PCT/JP2012/006430
§ 371 (c)(1),
(2) Date: May 6, 2014

(87) PCT Pub. No.: WO2013/069201
PCT Pub. Date: May 16, 2013

(65) Prior Publication Data
US 2014/0320058 A1 Oct. 30, 2014

(30) Foreign Application Priority Data
Nov. 7, 2011 (JP) ................. 2011-243890

(51) Int. Cl.
*H02P 25/06* (2016.01)
*H02P 29/032* (2016.01)
*H02K 41/03* (2006.01)

(52) U.S. Cl.
CPC ........... *H02P 25/06* (2013.01); *H02K 41/031* (2013.01); *H02P 29/032* (2016.02)

(58) Field of Classification Search
USPC ..................... 318/38, 687; 347/37
See application file for complete search history.

(56) References Cited

U.S. PATENT DOCUMENTS 4,675,582 A * 6/1987 Hommes ............... B60L 15/005
310/12.15
4,853,602 A 8/1989 Hommes et al.
(Continued)

FOREIGN PATENT DOCUMENTS

JP 2006-093425 A 4/2006
JP 2011-098786 A 5/2011
(Continued)

OTHER PUBLICATIONS

The extended European search report issued by the European Patent Office on May 19, 2015, which corresponds to European Patent Application No. 12848556.2-1707 and is related to U.S. Appl. No. 14/356,541.
(Continued)

*Primary Examiner* — Bentsu Ro
*Assistant Examiner* — Devon Joseph
(74) *Attorney, Agent, or Firm* — Studebaker & Brackett PC

(57) ABSTRACT

A linear conveyor includes: a linear motor stator which includes a plurality of electromagnets and in which each predetermined section can be individually controlled for conduction; a plurality of conveyance carriages each of which includes a linear motor mover; a linear scale which includes scale members secured to each of the conveyance carriages, and detectors disposed along a conveyance path; a plurality of motor controllers which individually controls conduction of electromagnets for each section based on the results of detecting the scale members by the detectors; and a data storage unit which stores position correction data for each conveyance carriage, determined based on the move-
(Continued)

ment error of each conveyance carriage measured in advance using a common measurement jig. Each motor controller controls conduction of the electromagnets using the position correction data stored in the data storage.

6 Claims, 16 Drawing Sheets

(56) References Cited

U.S. PATENT DOCUMENTS

| | | | | |
|---|---|---|---|---|
| 5,984,498 | A * | 11/1999 | Lem | G05B 19/0421 700/112 |
| 6,191,507 | B1 * | 2/2001 | Peltier | B65G 54/02 310/12.02 |
| 6,650,441 | B1 * | 11/2003 | Horigome | H04N 1/053 358/472 |
| 2003/0035020 | A1 * | 2/2003 | Menendez | G01D 5/34707 347/37 |
| 2003/0079971 | A1 * | 5/2003 | Veit | B65G 47/844 198/890.1 |
| 2005/0241911 | A1 | 11/2005 | Veit | |
| 2006/0207858 | A1 | 9/2006 | Veit | |
| 2008/0265690 | A1 | 10/2008 | Sasaki et al. | |
| 2008/0265826 | A1 * | 10/2008 | Sasaki | G01D 5/2013 318/687 |
| 2009/0225376 | A1 * | 9/2009 | Horade | B41J 11/003 358/494 |
| 2011/0050007 | A1 * | 3/2011 | Kubo | H02P 3/24 310/12.19 |
| 2011/0100252 | A1 | 5/2011 | Fukukawa | |
| 2011/0109252 | A1 | 5/2011 | Takagi | |

FOREIGN PATENT DOCUMENTS

| | | |
|---|---|---|
| JP | 2011-101552 A | 5/2011 |
| TW | 200908536 A | 2/2009 |
| TW | 201116959 A | 5/2011 |
| WO | 03/037761 A2 | 5/2003 |

OTHER PUBLICATIONS

International Search Report; PCT/JP2012/006430; Dec. 25, 2012.

* cited by examiner

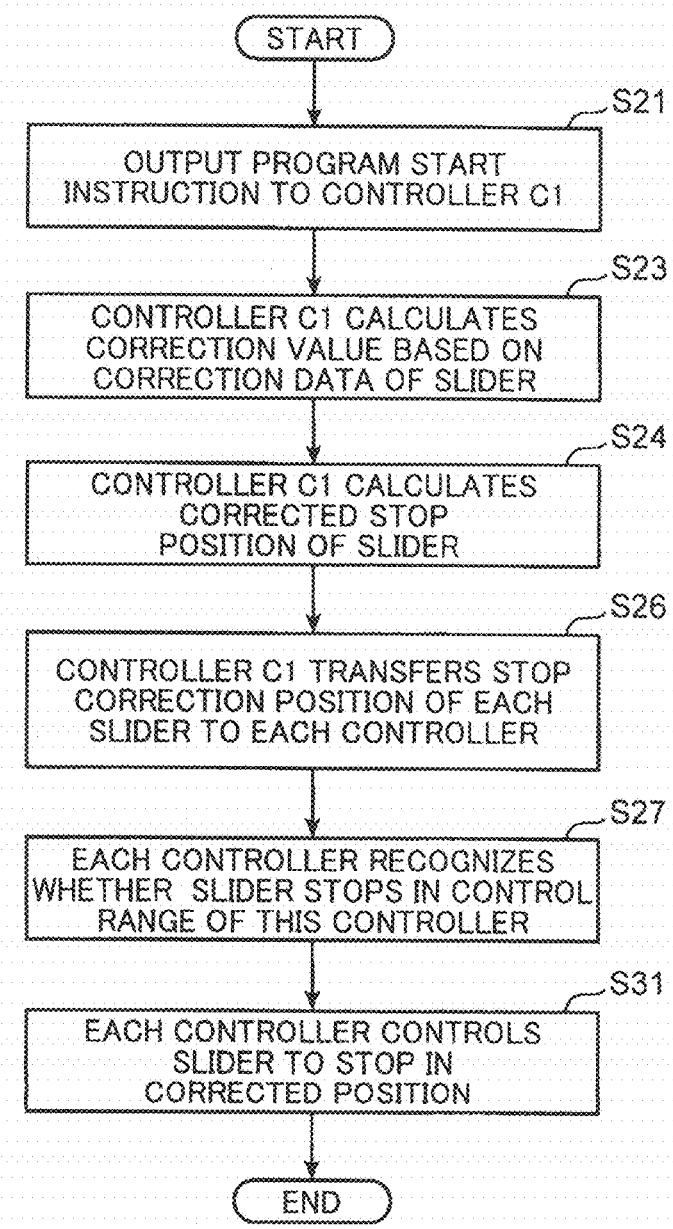

LINEAR CONVEYOR, CONVEYANCE CARRIAGE, AND DRIVE CONTROL METHOD FOR LINEAR CONVEYOR

CROSS REFERENCE TO RELATED APPLICATIONS

This application claims benefit of priority to Japanese Patent Application No. 2011-243890 filed on Nov. 7, 2011, and to International Patent Application No. PCT/JP2012/006430 filed on Oct. 5, 2012, the entire content of each of which are incorporated herein by reference.

TECHNICAL FIELD

The present technical field relates to a linear conveyor of which driving source is a linear motor.

BACKGROUND

A linear conveyor that moves a conveyance carriage (slider) along a rail disposed on a base using a linear motor as a driving source has been known (e.g. Japanese Patent Application Laid-open No. 2011-98786). A conveyance path of a linear conveyor may become long depending on the intended use, and in some cases a conveyance carriage may be removed and reinstalled as required. Therefore a movable magnet type linear motor may be used for the linear motor. The movable magnet type linear motor has a linear motor stator which includes a plurality of electromagnets (field magnets) secured to the base in a line and a linear motor mover which is a permanent magnet secured to the conveyance carriage, and provides driving force to the conveyance carriage by controlling the supply of current to the coils constituting the electromagnets. The movable magnet type linear motor has a linear scale constituted by a scale secured to the conveyance carriage and a plurality of sensors disposed on the base, and moves the conveyance carriage to a specific position by controlling the supply of current to the electromagnets based on the detected position by the linear scale.

In the linear conveyor, the form (linear or circular) of the conveyance path and the length of the conveyance path that is required may be different depending on the user, and in some cases, a change may be required later for the form and the length of the conveyance path. In order to easily meet such requirements, the linear conveyor could be unitized. In other words, a unit member is constructed by the base, the rail, the electromagnetics and the sensor of the linear scale. Then the linear conveyor is constructed by linking a plurality of unit members, and a motor controller is disposed for each unit member so that supply of current to the electromagnets of each unit member is individually controlled.

In this case however, the following problems exist. Each conveyance carriage has a unique movement error due to a processing error and an assembly error of a scale, and each sensor of the unit member also has a unique detection error due to an installation error and a characteristic difference. Therefore in order to accurately position the conveyance carriage in the unitized linear conveyors, the movement error of each conveyance carriage of each unit member must be checked in advance, and the movement error in accordance with the conveyance carriage must be corrected for each unit member. In this case, the number of movement error data to be acquired in advance is a number generated by multiplying the number of unit members (motor controllers) by the number of conveyance carriages. However, an operation to acquire this number of movement error data is not easy. Further, in the case of adding a conveyance carriage to an already installed and operating linear conveyor, it is difficult to accurately check the movement error of a conveyance carriage (conveyance carriage that is newly added) for each unit member. Therefore guaranteeing the positioning accuracy for the conveyance carriage that is added later is difficult.

SUMMARY

It is an object of the present disclosure to provide a linear conveyor where a linear motor stator is divided into a plurality of sections, and each section can be individually controlled, but conveyance carriages can still be accurately positioned with a low data collection volume.

A linear conveyor according to an aspect of the present disclosure has: a linear motor stator which includes a plurality of electromagnets arranged along a predetermined conveyance path, and in which each predetermined section can be individually controlled for conduction; a plurality of conveyance carriages each including a linear motor mover which is a permanent magnet and constitutes a linear motor in tandem with the linear motor stator, the conveyance carriages being movably disposed along the conveyance path; a linear scale which includes scale members secured to each of the conveyance carriages, and detectors disposed along the conveyance path so that the scale members can be detected; a plurality of motor controllers which is disposed in correspondence with the sections of the linear motor stator respectively, and individually controls conduction of the electromagnets for each section based on the results of detecting the scale member by the detector; and a data storage unit which stores position correction data for each conveyance carriage, which is data for correcting movement error unique to each conveyance carriage and is determined based on the movement error of each conveyance carriage measured in advance using a common measurement jig, wherein each of the plurality of motor controllers determines, as control data, either the position correction data stored in the data storage unit or processed data obtained through processing using the position correction data, and controls the conduction of the electromagnets using the control data, so as to stop each conveyance carriage at a target stopping position.

BRIEF DESCRIPTION OF THE DRAWINGS

FIG. 2 also shows a slider 4 disposed in the area indicated with the broken line in FIG. 1.

FIG. 16 is a flow chart depicting an example of controlling the slider in the linear conveyor.

DETAILED DESCRIPTION

An embodiment of the present disclosure will be described with reference to the accompanying drawings.

Figure 1:
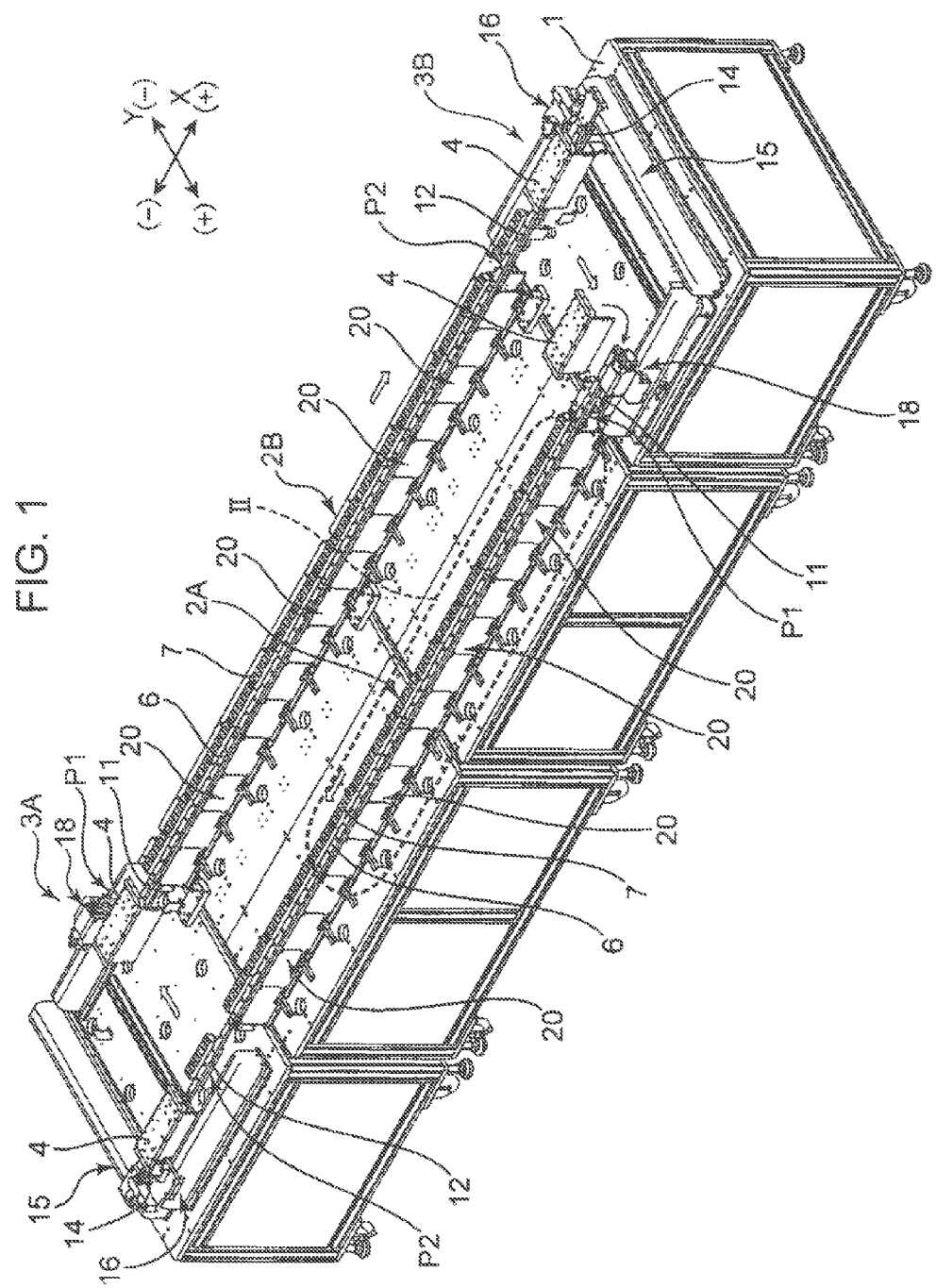
FIG. 1 is a perspective view depicting a general image of a linear conveyor according to the present disclosure.

FIG. 1 is a perspective view of the entire linear conveyor according to the present disclosure. In FIG. 1, two directions (X direction, Y direction), which intersect orthogonally on the horizontal surface, are shown as the direction indications.

As illustrated in FIG. 1, the linear conveyor includes a base 1, a pair of linear conveyance units (first linear conveyance unit 2A and second linear conveyance unit 2B) which is disposed on the base 1 and extends in parallel in a specific direction (X direction), direction reversing units (first direction reversing unit 3A and second direction reversing unit 3B) which are located on both sides of the linear conveyance units 2A and 2B respectively in the longitudinal direction, and a plurality of sliders 4 (corresponding to the conveyance carriage of the present disclosure) which move along the linear conveyance units 2A and 2B respectively.

Each of the linear conveyance units 2A and 2B is for moving the sliders 4 in the X direction, and include a rail 6 that extends in the X direction respectively so as to move the sliders 4 along the rail 6. Each of the direction reversing units 3A and 3B is for reversing the moving direction of the slider 4 at the end positions of the linear conveyance units 2A and 2B by moving each slider 4 in parallel from one of the linear conveyance units 2A and 2B to the other. In other words, according to this linear conveyor, each slider 4 moves from one end (X direction (+)) to the other end (X direction (−)) of the first linear conveyance unit 2A as the white arrow indicates, and is then moved from the first linear conveyance unit 2A to the second linear conveyance unit 2B by the first direction reversing unit 3A. Then each slider 4 moves from one end (X direction (−)) to the other end (X direction (+)) of the second linear conveyance unit 2B, and is then moved from the second linear conveyance unit 2B to the first linear conveyance unit 2A by the second direction reversing unit 3B. Thereby each slider 4 moves in a loop.

Each of the direction reversing units 3A and 3B has the following configuration. The first direction reversing unit 3A will be described here.

The first direction reversing unit 3A includes a receiving unit P2, a sending unit P1, a slide mechanism 15, a retraction mechanism 16 and a sending mechanism 18. The receiving unit P2 has a rail 12 which is connected to the rail 6 of the upstream side linear conveyance unit (first linear conveyance unit 2A) and receives a slider 4 from the first linear conveyance unit 2A. The sending unit P1 has a rail 11 which is connected to the rail 6 of the downstream side linear conveyance unit (second linear conveyance unit 2B) and sends the slider 4 to the second linear conveyance unit 2B. The slide mechanism 15 has a support unit 14 that supports a slider 4 and slides the slider 4, supported by the support unit 14 in the Y direction, along with the support unit 14, from the position corresponding to the receiving unit P2 (illustrated position) to the position corresponding to the sending unit P1. The retraction mechanism 16 retracts a slider 4 located in the receiving unit P2 to the support unit 14 of the slide mechanism 15. The sending mechanism 18 moves the slider 4 supported by the support unit 14 out of the support unit 14 to the sending unit P1, and furthermore pushes the slider 4 out of the sending unit P1 to the second linear conveyance unit 2B.

In other words, a slider 4 that reached the end position of the first linear conveyance unit 2A is received by the receiving unit P2 of the first direction reversing unit 3A from the end position, and is retracted by the retraction mechanism 16 from the receiving unit P2 to the support unit 14 of the slide mechanism 15. Then the slider 4, along with the support unit 14, is moved in parallel to the position corresponding to the sending unit P1 by the operation of the slide mechanism 15, is moved out of the support unit 14 to the sending unit P1 by the operation of the sending mechanism 18, and is then pushed out to the second linear conveyance unit 2B. By moving each slider 4 from the first linear conveyance unit 2A to the second linear conveyance unit 2B in this way, the first direction reversing unit 3A reverses the moving direction of the slider 4.

The above is the configuration of the first direction reversing unit 3A, but the second direction reversing unit 3B also has the same configuration as the first direction reversing unit 3A, except that a slider 4 is received from the second linear conveyance unit 2B to the receiving unit P2, and the slider 4 is sent from the sending unit P1 to the first linear conveyance unit 2A.

In this linear conveyor, a slider 4 can be attached and removed in the second direction reversing unit 3B. In concrete terms, an additional slider 4 can be inserted into the conveyance path by installing a new slider 4 on the rail 11 of the sending unit P1 (see FIG. 1), and a slider 4 received into the rail 12 of the receiving unit P2 can be removed from the conveyance path by drawing the slider 4 out of the rail 12. By this configuration, the number of sliders 4 on the conveyance path can be changed in this linear conveyor.

Each of the sliders 4 is driven by the linear motor as a driving source in the linear conveyance units 2A and 2B respectively. The linear motor is constituted by a linear motor stator 7 which is disposed in each of the linear conveyance units 2A and 2B, and a linear motor mover 8 which is disposed in each of the sliders 4. Including this aspect, concrete configurations of the linear conveyance units 2A and 2B and the slider 4 will now be described with reference to FIG. 2 to FIG. 5. The basic configuration is the same for the linear conveyance units 2A and 2B, hence the first linear conveyance unit 2A will be described here.

Figure 2:
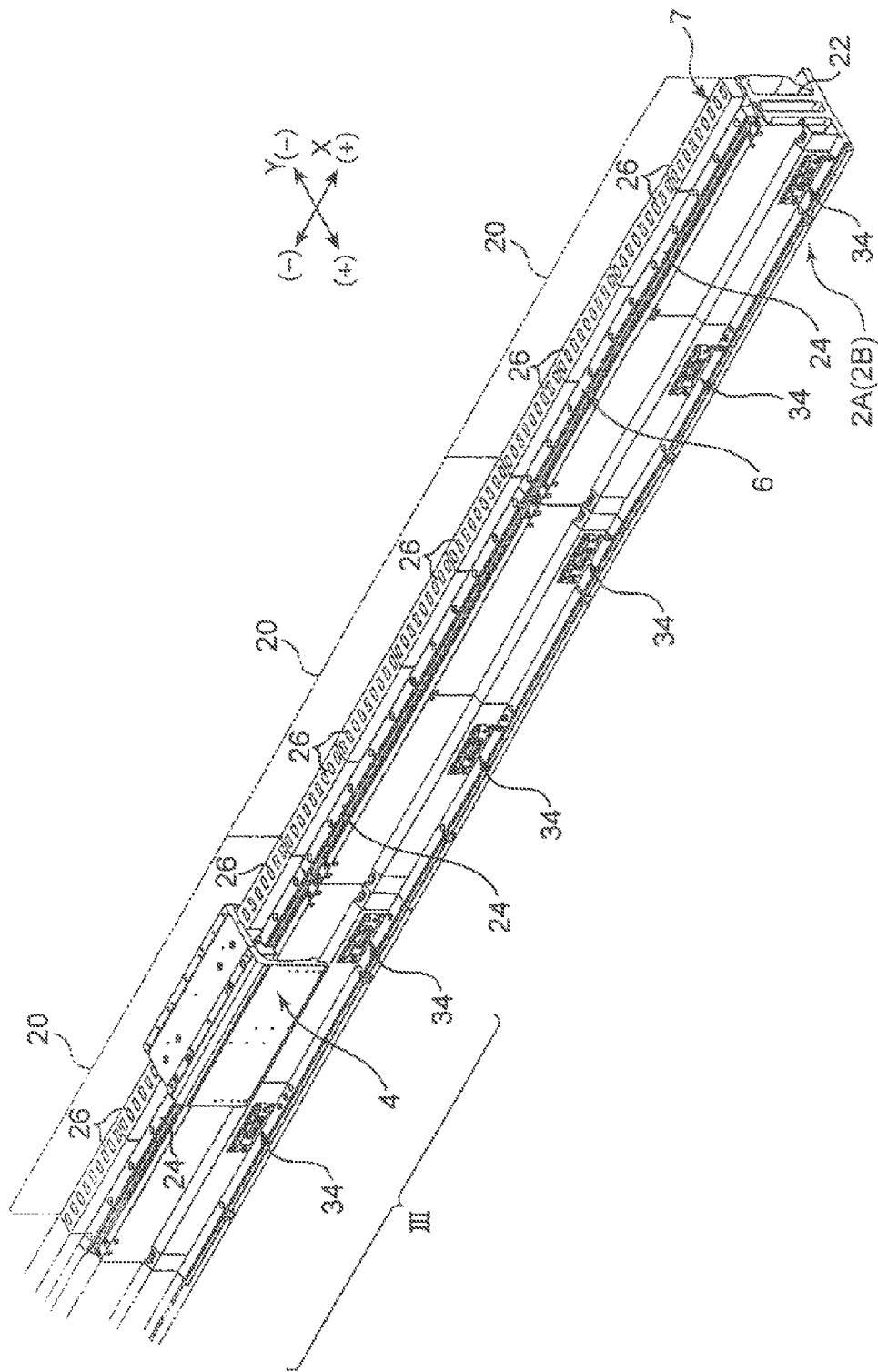
FIG. 2 is a perspective view depicting a conveyance path (linear conveyance unit) of the linear conveyor, corresponding to an area encircled with a broken line in FIG. 1.

As illustrated in FIG. 2, the first linear conveyance unit 2A is constituted by a plurality of unit members 20 which are linked in the X direction. In this example, the first linear conveyance unit 2A is constituted by four unit members 20 which are linked together.

Figure 3:
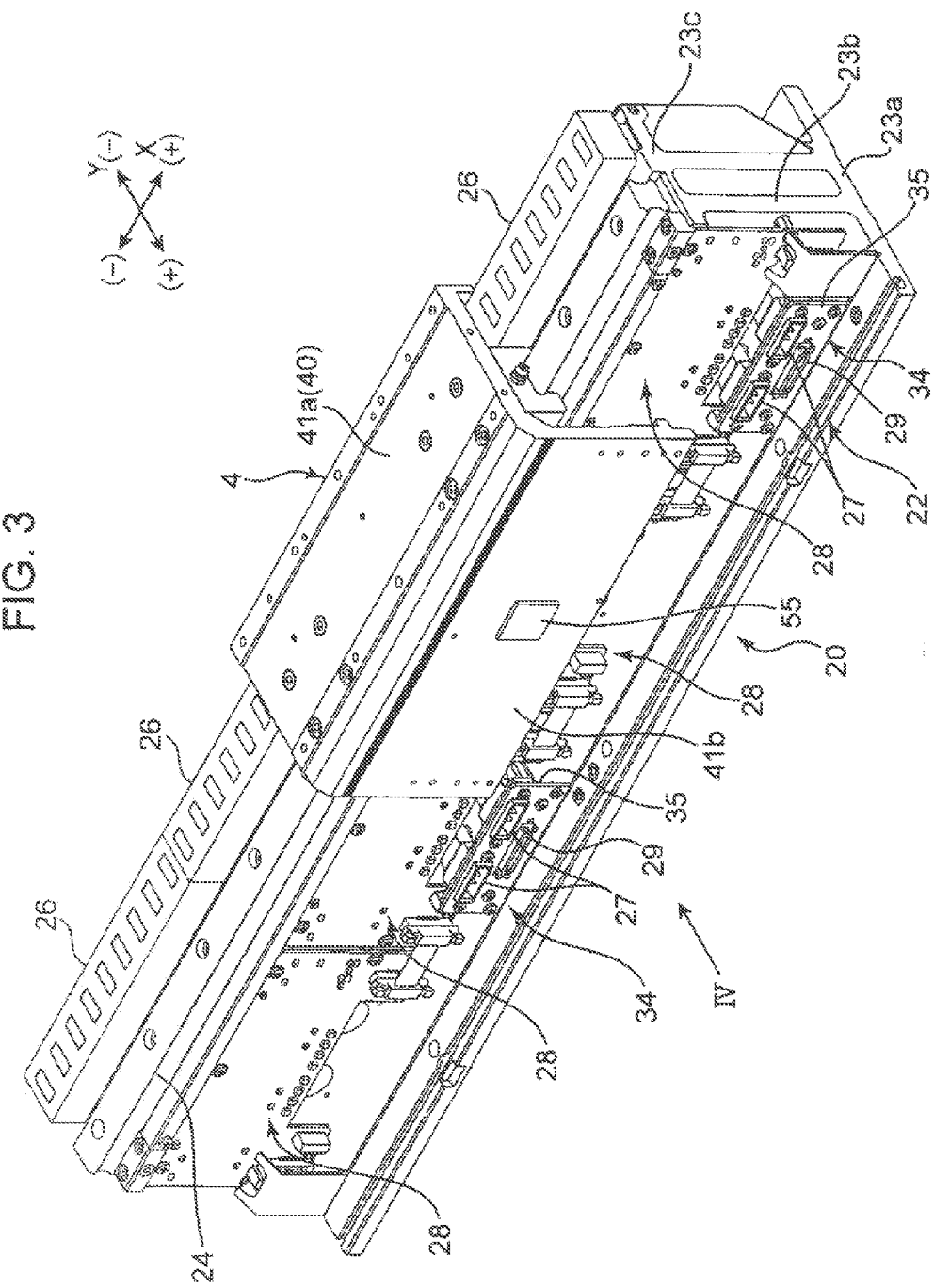
FIG. 3 is a perspective view depicting a unit member constituting the linear conveyor, corresponding to an area indicated with reference character III in FIG. 2.
Figure 4:
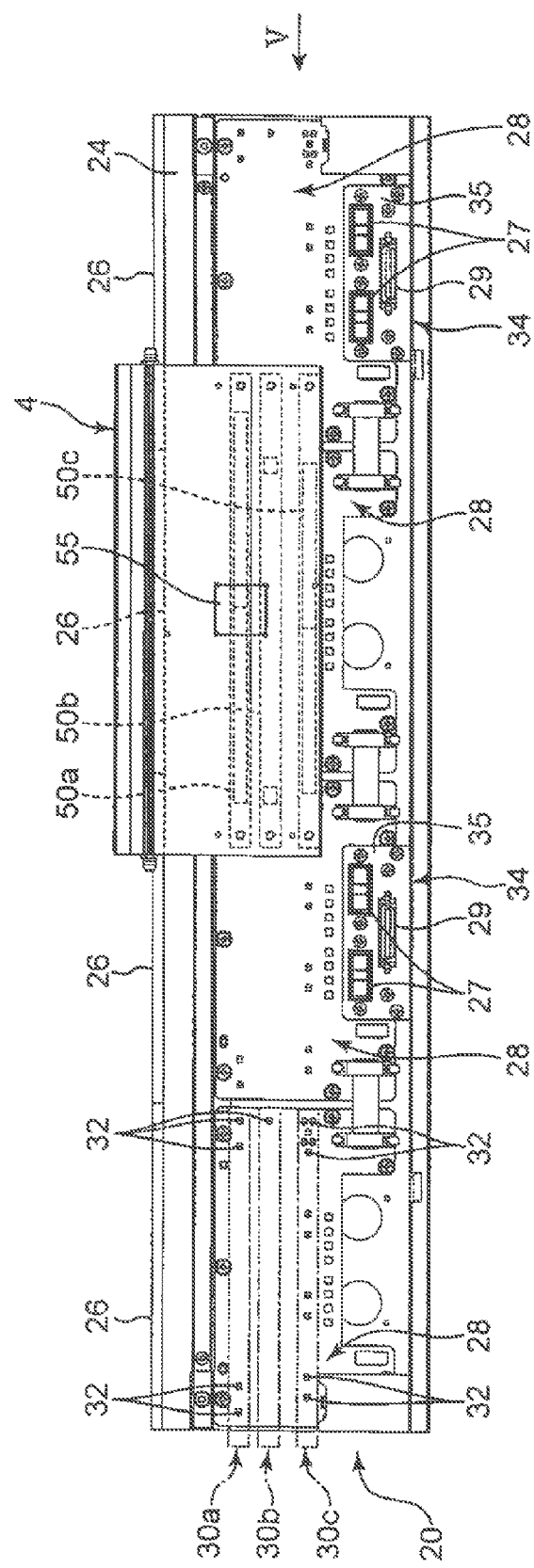
FIG. 4 is a view from a direction indicated with an arrow IV in FIG. 3, depicting the unit member.
Figure 5:
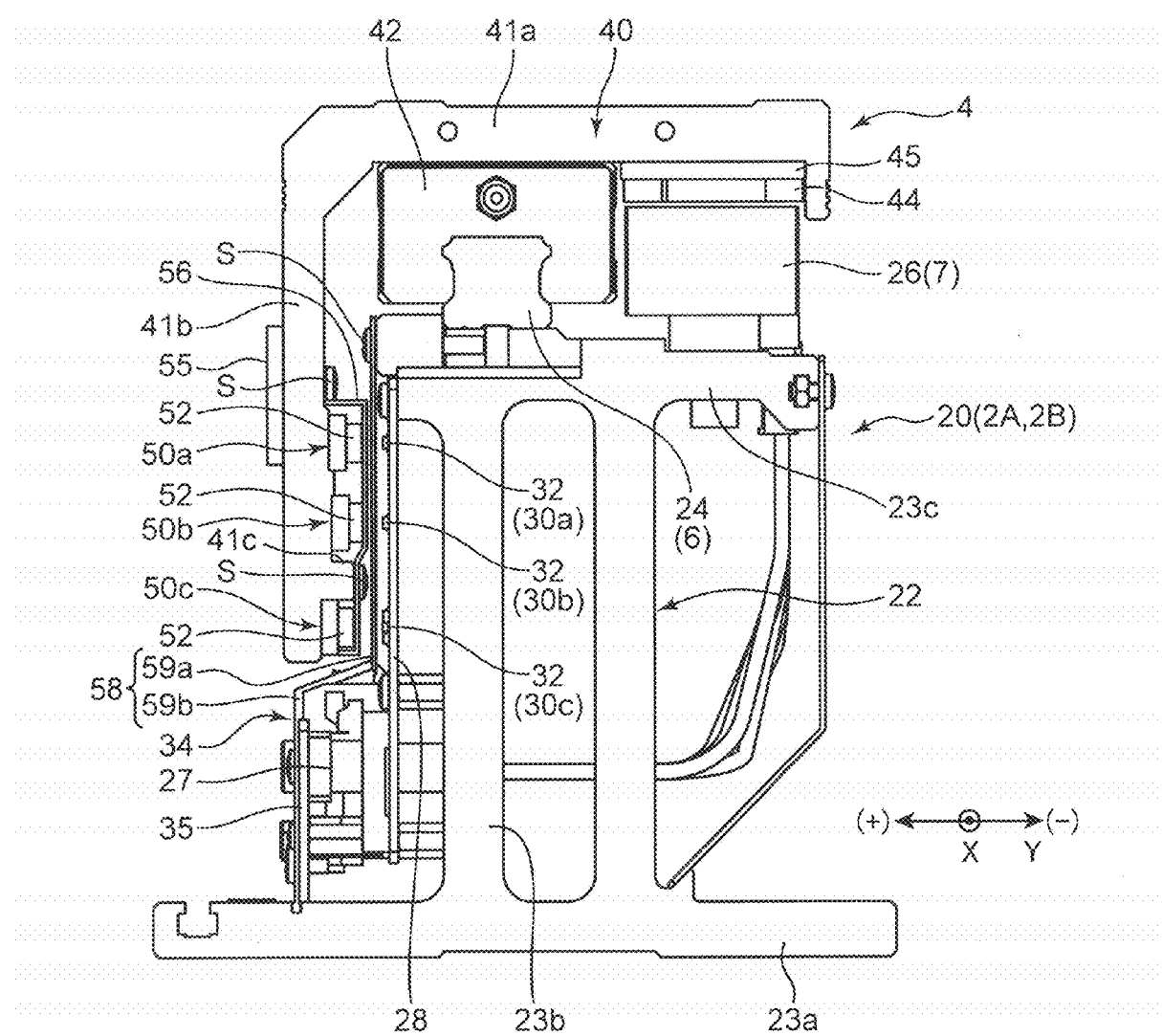
FIG. 5 is a view from a direction indicated with an arrow V in FIG. 4, depicting the unit member and a slider.

As illustrated in FIG. 3 to FIG. 5, each unit member 20 includes a long frame 22 which extends in the X direction, a unit rail 24 which is secured to this frame 22, electromagnets 26 and sensor substrates 28.

The frame 22 includes a base plate portion 23a which is rectangular extending in the X direction, a top plate portion 23c which is located above the base plate portion 23a and is rectangular extending in the X direction, and a linking portion 23b which extends in the vertical direction between the plate portions 23a and 23c and links the plate portions 23a and 23c along the longitudinal direction, and these portions 23a to 23c are integrally formed by an aluminum alloy. The unit rail 24 is secured to the upper surface of the top plate portion 23c of the frame 22 so as to extend in a direction the same as the longitudinal direction of the top plate portion 23c, and a plurality of electromagnets 26 are arranged in a line (series) along the unit rail 24 in positions that are on the upper surface of the top plate portion 23c and on the rear side (Y direction (−) side) of the unit rail 24. In this example, four electromagnets 26 each of which has an identical structure is secured. These electromagnets 26 constitute the linear motor stator 7, each of which includes a plurality of coils arranged in a line in the X direction.

A plurality of sensor substrates 28 is secured to the linking portion 23b of the frame 22 as illustrated in FIG. 4 and FIG. 5. In this example, four sensor substrates 28, the same as the number of electromagnets 26, are secured. In concrete terms, the sensor substrates 28 are arranged in series along the unit rail 24 and secured to the linking portion 23b in this state along the side wall of the linking portion 23b in upright positions.

The sensor substrates 28 (corresponding to the detectors of the present disclosure) constitute a linear scale (magnetic linear scale) in tandem with the later mentioned magnetic scales 50a to 50c, which are secured to each of the sliders 4. Each of the sensor substrates 28 is disposed in front of (the Y direction (+) side) of each electromagnet 26, so as to detect the magnetic scales 50a to 50c in a section where each electromagnet 26 is disposed respectively. In other words, in this unit member 20, the longitudinal direction (X direction) thereof is divided into four equal sections, where one section becomes one control section of the linear motor, and an electromagnet 26 having the same length as the section is secured to each section. Then as mentioned later, a motor controller C is disposed for each section, so that the supply of current to the electromagnet 26 in each section can be individually controlled by the motor controller C based on the detection of the magnetic scales 50a to 50c by the sensor substrate 28. In this example, the total length of the unit member 20 (total length in the X direction) is 640 mm, hence the total length of one control section (electromagnet 26) is 160 mm.

As illustrated in FIG. 4, the sensor substrate 28 has three sensor regions 30a to 30c arranged in the vertical direction (first sensor region 30a, second sensor region 30b and third sensor region 30c in order from the top). In each sensor region 30a to 30c, one or a plurality of magnetic sensor(s) 32 is constituted by a Hall element or an MR element that can detect the magnetic scales 50a to 50c respectively. The magnetic sensors 32 of each sensor region 30a to 30c are secured in the X direction according to a predetermined arrangement.

The arrangement and the number of magnetic sensors 32 in each sensor region 30a to 30c are the same for each sensor substrate 28, and each magnetic sensor 32 detects the later mentioned magnetic scales 50a to 50c and outputs a signal of output voltage (amplitude) according to the magnetic flux density thereof.

In the unit member 20, a wiring connection unit 34 for the electromagnet 26 and the sensor substrate 28 is disposed in a position on the front side of the sensor 28 (Y direction (+) side) and below a frame 40 (suspended portion 41b), described later, of the slider 4 during movement.

This wiring connection unit 34 includes a fixing plate 35 which is vertically disposed on the base plate portion 23a in a position in front of the linking portion 23b of the frame 22, and a wiring connector 27 of the electromagnet 26 and a wiring connector 29 of the sensor substrate 28 which are held by the fixing plate 35 respectively. These connectors 27 and 29 are disposed in the end of the wiring material guided from the electromagnet 26 and the sensor substrate 28 respectively, and are secured to the fixing plate 35 facing the front so as to be connected to the opposite side connector.

In this example, the wiring connection unit 34 is disposed in a front part of the first and third sensor substrates 28 in order from the right end (right end in FIG. 4), and the wiring connectors 27 of two adjacent electromagnets 26 are held by the same fixing plate 35 of the wiring connection unit 34 respectively. Concerning the wiring connector 29 of the sensor substrate 28, one common wiring connector 29 is disposed for two adjacent sensor substrates 28, and this wiring connector 29 is held by the fixing plate 35 of each wiring connection unit 34.

The first linear conveyance unit 2A is constructed by four unit members 20 described above. In the first linear conveyance unit 2A, four unit members 20 are arranged (linked) in series in the longitudinal direction, and the base plate portion 23a of each frame 22 is secured to the base 1 respectively by a fixing means, such as a bolt. By linking the four unit members 20 in this way, the unit rail 24 of each unit member 20 is connected in the X direction, and the rail 6 is constructed, and in the same way, the electromagnets 26 are connected in the X direction, and the linear motor stator 7 is constructed.

The configuration of the first linear conveyance unit 2A was described above, but the second linear conveyance unit 2B also has a similar configuration as the first linear conveyance unit 2A.

As illustrated in FIG. 3 to FIG. 5, the slider 4 includes a frame 40, a guide block 42, a linear motor mover 8 (permanent magnet 44), magnetic scales 50a to 50c, and an RF (Radio Frequency) tag 55 which are secured to the frame 40 respectively.

The frame 40 is a base of the slider 4, and has a shape that is long in the X direction. In concrete terms, the frame 40 has an inverted L shape in the cross-section, constituted by: a horizontal portion 41a which is located above the rails 6 of the linear conveyance units 2A and 2B and has a rectangular shape; and a vertical portion 41b which is suspended from the front side (Y direction (+) side) of the horizontal portion 41a in the width direction, so as to face the sensor substrate 28, and the horizontal portion 41a and the vertical portion 41b are integrally formed by an aluminum alloy.

A plurality of screw holes for securing a table (palette), tools or the like are formed on the upper surface of the horizontal portion 41a according to a predetermined arrangement. The guide block 42 is secured to the lower surface of the horizontal portion 41a, and the slider 4 is movably supported on the rail 6 by the guide block 42 which is mounted on the rail 6. The guide block 42 and the rail 6 (unit rail 24) are constituted by a linear guide, for example.

The linear motor mover 8 is secured to a position on the lower surface of the horizontal portion 41a behind the guide block 42 (Y direction (−) side), specifically a position facing the linear motor stator 7 of the linear conveyance units 2A and 2B (electromagnet 26 of the unit member 20). The linear motor mover 8 includes a plate type yoke 45 that is secured to the lower surface of the horizontal portion 41a, and a plurality of plate type permanent magnets 44, which are arranged on a line in the X direction (moving direction of the slider 4), and secured to the lower surface of the yoke 45 in this state. These permanent magnets 44 are arranged such that the N-pole and the S-pole alternately appear on the lower surface. In other words, electric current of any of the mutually different u-phase, v-phase and w-phase is supplied to the coils of the linear motor stator 7 (electromagnets 26) by the later mentioned motor controller C, whereby a driving force is generated in the frame 40 by interaction between the magnetic flux generated in the coils and the magnetic flux generated in the permanent magnets 44, and this driving force moves the slider 4 along the rail 6.

The magnetic scales 50a to 50c (corresponding to the scale member of the present disclosure) are secured to the inner side face (right side face in FIG. 5) of the vertical portion 41b of the frame 40 so as to face the sensor substrate 28.

The magnetic scales 50a to 50c are vertically disposed (first magnetic scale 50a, second magnetic sale 50b and third magnetic scale 50c in order from the top), and the first magnetic scale 50a faces the first sensor region 30a, the second magnetic scale 50b faces the second sensor region 30b, and the third magnetic scale 50c faces the third sensor region 30c.

Although a detailed drawing is omitted, the magnetic scales 50a to 50c are configured so that the permanent magnets 52 are arranged on a line in the X direction within a predetermined scale length, and the N-pole and the S-pole alternately appear on the sensor substrate 28 side.

The number and arrangement of the permanent magnets 52 of the respective magnetic scales 50a to 50c and the number and arrangement of the magnetic sensors 32 of the respective sensor regions 30a to 30c are set and the onboard circuits on the sensor substrate 28 are constructed so that a predetermined signal, for detecting the position of the slider 4, is outputted from the sensor substrate 28 to the controller C by the magnetic sensors 32 of each sensor region 30a to 30c detecting a corresponding magnetic scale 50a to 50c while the slider 4 is moving.

In concrete terms, the number and arrangement of the permanent magnets 52 of the respective magnetic scales 50a to 50c and the number and arrangement of the magnetic sensors 32 of the respective sensor regions 30a to 30c are set and the onboard circuits of the sensor substrate 28 are constructed so that the sensor substrate 28 outputs a sinusoidal signal in phase A and a sinusoidal signal in phase B, which has the same amplitude and cycle, however phase is shifted 90° compared to the sinusoidal signal in phase A. Based on detection of the first magnetic scale 50a by the magnetic sensors 32 of the first sensor region 30a, the sensor substrate 28 outputs a signal in phase Z based on the detection of the second magnetic scale 50b by the magnetic sensors 32 of the second sensor region 30b. The sensor substrate 28 outputs a plurality of waveform signals of which cycles are longer than phase A and phase B, and of which phases are shifted from each other, with the same amplitude, based on the detection of the third magnetic scale 50c, by the magnetic sensors 32 of the third sensor region 30c. Because of this configuration, the motor controller C detects a position of the slider 4 based on the input signal from the sensor substrate 28 while the linear conveyor is operating, and controls the supply of the current to the sensor substrate 28 (linear motor stator 7) based on the detected position, whereby the slider 4 can be moved at a predetermined speed and can be stopped at a predetermined target stopping position.

In FIG. 5 a scale cover 56 is secured to the vertical portion 41b of the frame 40. This scale cover 56 covers the magnetic scales 50a to 50c, protecting the magnetic scales 50a to 50c. A sensor cover 58 is secured to the frame 22 of the unit member 20. The sensor cover 58 covers the sensor substrate 28 protecting the sensor substrate 28. Both of these covers 56 and 58 are made of an aluminum alloy. In FIG. 3 and FIG. 4, the linear conveyor is illustrated in a state where the covers 56 and 58 are omitted.

Figure 6:
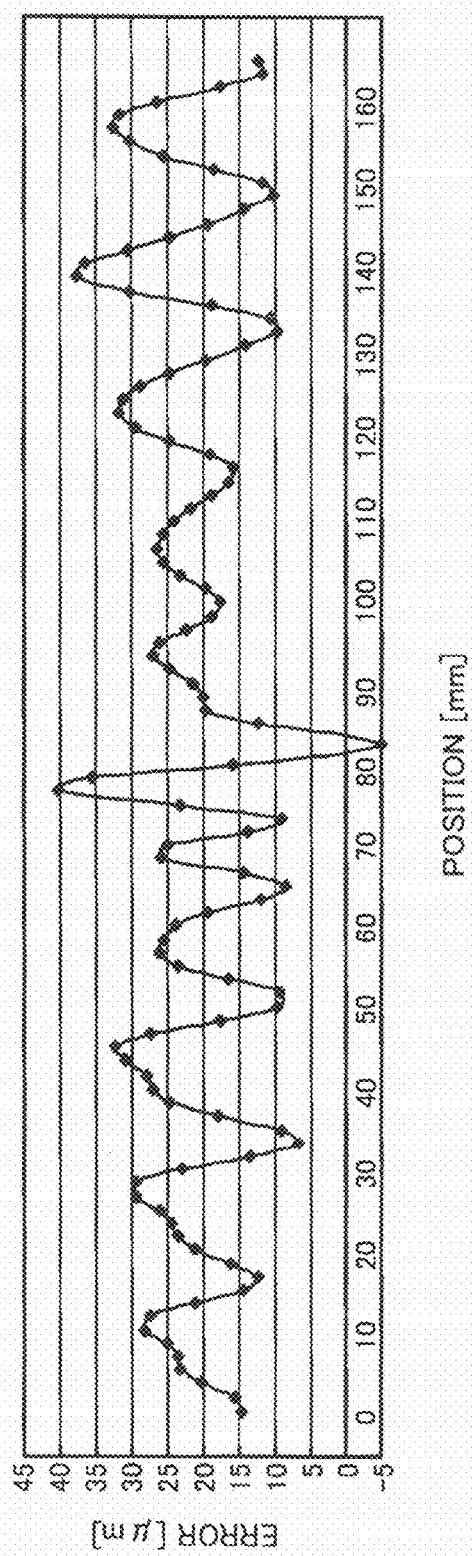
FIG. 6 is a diagram (graph) of an example of position correction data.
Figure 7:
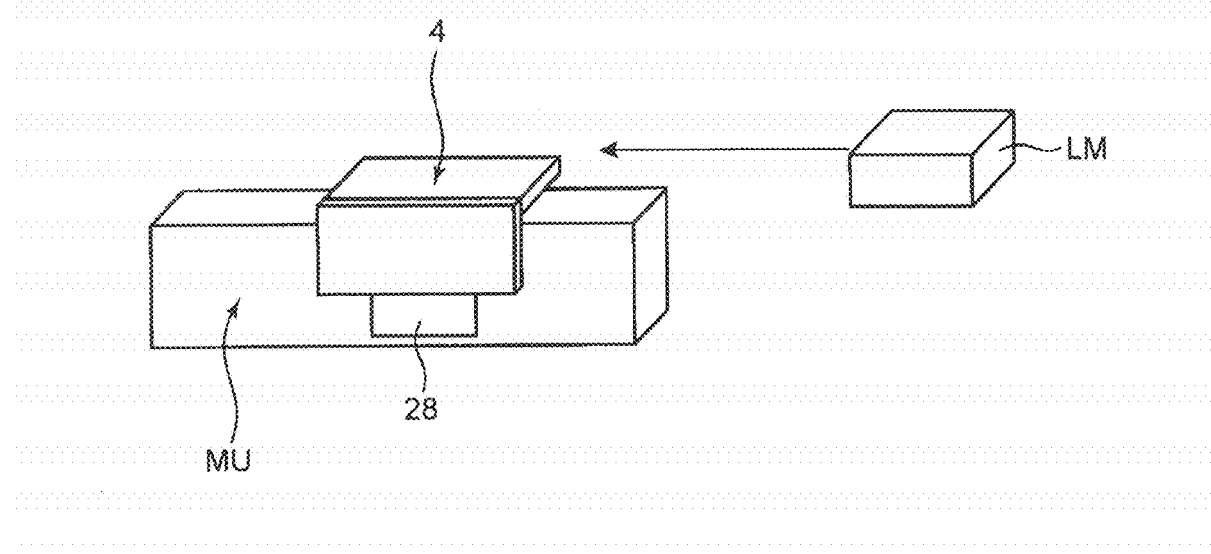
FIG. 7 is a schematic diagram depicting an example of a jig for measuring a movement error of the slider.

The RF tag 55 is secured to the outer side face (left side face in FIG. 5) of the vertical portion 41b of the frame 40, at a center position of the vertical portion 41b in the longitudinal direction (X direction) and the vertical direction respectively. Unique information specific to the slider 4 is stored in the RF tag 55. In concrete terms, ID information (identification data) of the slider 4 and position correction data for correcting the movement error specific to the slider 4 are stored. In this example, the movement error data shown in FIG. 6 is stored as the position correction data. For this data, a measurement jig constituted by a master unit member MU, which has a configuration similar to the unit member 20 and includes one sensor substrate 28, and a laser length measurement device LM, as illustrated in FIG. 7, is used, and an error between a position of the slider 4 determined by the output of the sensor substrate 28, when the slider 4 is moved from a predetermined movement start point on the master unit member MU and a position of the slider 4 determined by the laser length measurement device LM (absolute position), is determined for one control section (160 mm). The position correction data (movement error data) of each slider 4 has been measured in advance by a common measurement jig.

This linear conveyor includes a reader/writer 60 (see FIG. 8) which can read or write the unique information recorded in the RF tag 55 of each slider 4 without contact. The reader/writer 60 is disposed near the conveyance start point of the linear conveyor. In this example, the end of the first linear conveyance unit 2A on the upstream side is the conveyance base point, and the reader/writer 60 is disposed on the side of the sending unit P1 (sending unit P1 of the second direction reversing unit 3B), which sends the slider 4 to the conveyance base point.

In this example the frame 40 and the guide block 42 correspond to the frame member of the present disclosure, and the RF tag 55 corresponds to the storage medium of the present disclosure. The reader/writer 60 corresponds to the reading unit of the present disclosure.

Now a control system of the linear conveyor will be described.

Figure 8:
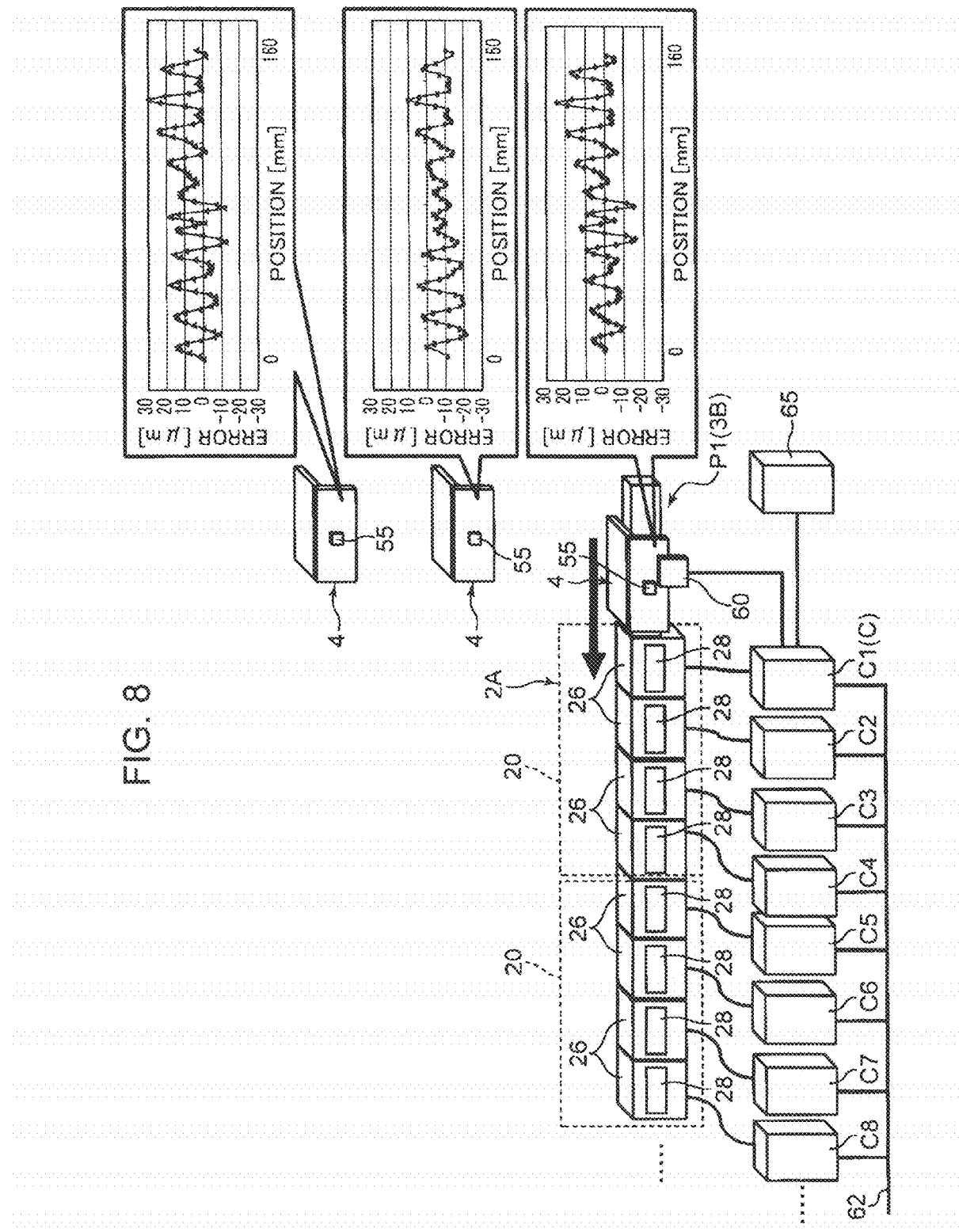
FIG. 8 is a wiring diagram depicting a control system of the linear conveyor.

FIG. 8 is a wiring diagram depicting a control system of the linear conveyor. As illustrated in FIG. 8, the linear conveyor has a plurality of motor controllers C (C1, C2, . . . ; corresponding to the motor controllers of the present disclosure) to control the linear motors of the linear conveyance units 2A and 2B. In this linear conveyor, an independent electromagnet 26 is disposed for each control section of the unit member 20, as mentioned above, and the supply of current to the electromagnet 26 in each control section is controlled by the motor controller C. Therefore this linear conveyor, in which each of the linear conveyance units 2A and 2B includes four unit members 20 respectively, has a total of 32 motor controllers C. Each motor controller C is connected to a LAN (Local Area Network) 62 respectively, whereby the motor controllers C are interlinked so that data can be transmitted. The reader/writer 60 is connected to the motor controller C that controls the supply of current to the electromagnet 26 in the control section located on the most upstream side when viewed from the conveyance start point (end of the first linear conveyance unit 2A on the upstream side), that is, the electromagnet 26 located on the most upstream side of the unit member 20 which constitutes the first linear conveyance unit 2A and is located on the most upstream side (right end in FIG. 8).

In the following description, if it is necessary to distinguish the motor controllers C depending on the control section, the motor controllers C are referred to as first controller C1, second controller C2, third controller C2, . . . thirty-second controller C32 in order from the most upstream side.

The linear conveyor also includes a PLC (Programmable Logic Controller) 65 for starting the operation thereof. The PLC 65 is connected to the first controller C1, and outputs a signal to the first controller C1 to start an internal program of the first controller C1. Based on this signal input, the first controller C1 starts the internal program as described later, and controls the other controllers C2 to C32 according to the information written in the program, such as the stopping position (target stopping position) and the moving speed of the slider 4. Each of the direction reversing units 3A and 3B has an independent controller separate from the motor controllers C, and this controller independently controls the driving of the slide mechanism 15, the retraction mechanism 16 and the sending mechanism 18.

Figure 9:
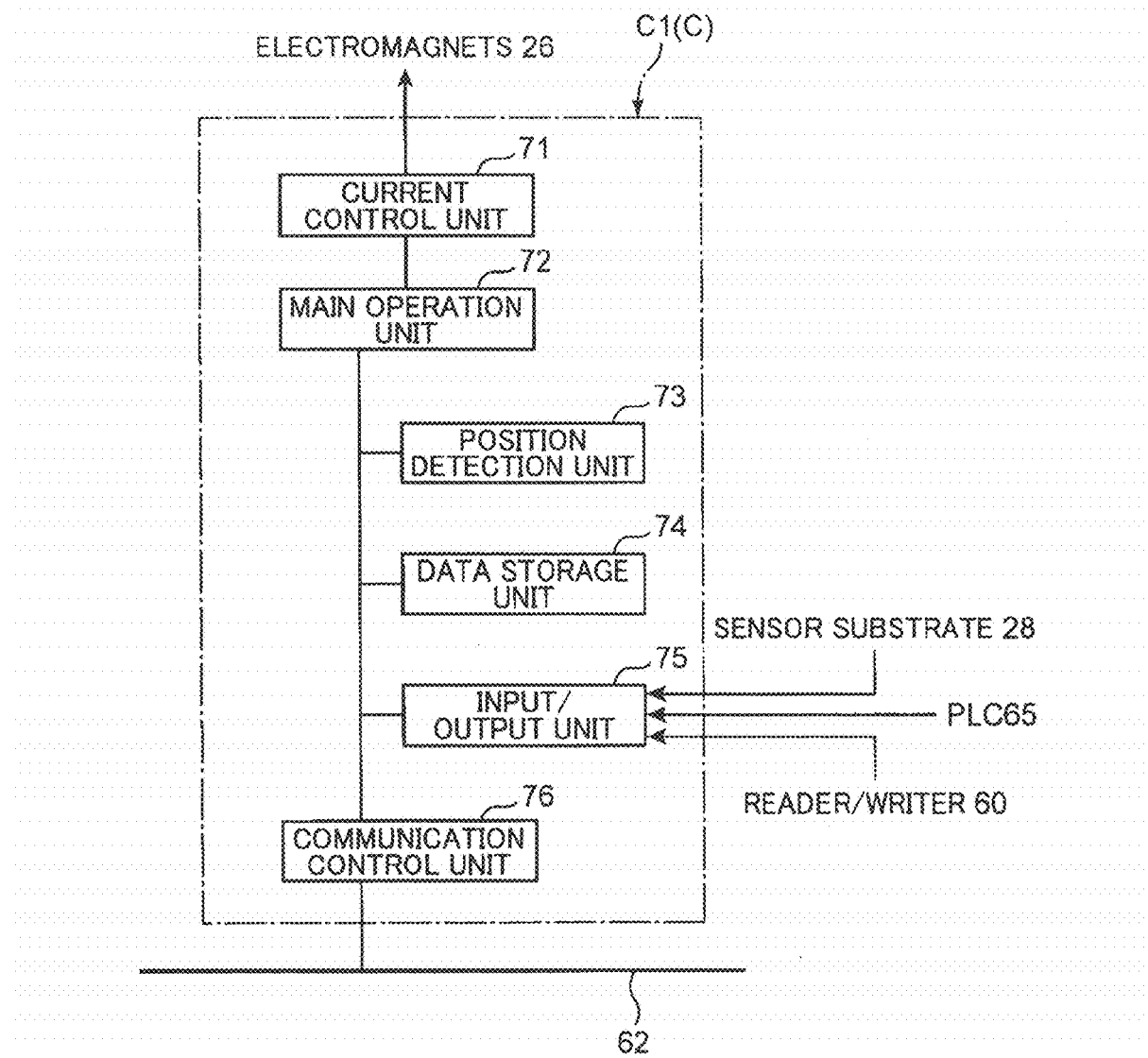
FIG. 9 is a block diagram depicting a functional configuration of a motor controller.

FIG. 9 is a block diagram depicting a functional configuration of the motor controller C (first controller C1). The first controller C1 is constituted by a circuit board on which a CPU and various memories are mounted, and includes, as the functional configuration, a current control unit 71, a main operation unit 72, a position detection unit 73, a data storage unit 74 (corresponding to the data storage unit of the present disclosure), an input/output unit 75 and a communication control unit 76.

The main operation unit 72 is for controlling the supply of current to the electromagnet 26 via the current control unit 71, and executes programs stored in the program storage unit (not illustrated) included in the main operation unit 72 based on signal input from the PLC 65, controls the supply of current to the electromagnet 26 based on the information written in the programs, such as the stopping position (target stopping position) and the moving speed of the slider 4, and performs data processing required for control.

The position detection unit 73 detects a position of the slider 4 based on a signal from the sensor substrate 28 that is inputted via the input/output unit 75.

The data storage unit 74 stores unique information of each slider 4 read by the reader/writer 60, and stores the arrangement sequence of each slider 4 on the conveyance path. If a target stopping position of a slider 4 is in a section under control of the first controller C1, the main operation unit 72 refers to the position correction data of the slider 4 in the data storage unit 74, corrects the target stopping position data based on the position correction data, and controls the supply of current to the electromagnet 26 according to the corrected target stopping position data.

The communication control unit 76 controls the data transmission between the first controller C1 and the other controllers C2 to C32.

The functional configuration of the first controller C1, out of the motor controllers C, was described here but the other controllers C2, C3 . . . also have a similar configuration as the controller C1, except that the first controller C1 includes such information as the stopping position (target stopping position) of the slider 4 and the moving speed in the internal program, and receives direct input of the signal from the PLC 65 and unique information of the slider 4 read by the reader/writer 60.

Now control of the linear motor of this linear conveyor will be described.

First the processing to read and distribute the unique information of each slider 4 will be described. In this linear conveyor, the linear motor is controlled by the motor controllers C for each control section of the linear conveyance units 2A and 2B. Therefore in order to position each slider 4 accurately, each motor controller C requires an environment to refer to the position correction data of each slider 4, and in this linear conveyor, each motor controller C acquires the position correction data according to the flow chart in FIG. 10.

When the slider 4 is positioned at the conveyance start point (the sending unit P1 of the second direction reversing unit 3B), the first controller C1 (the main operation unit 72) reads the ID information stored on the RF tag 55 of the slider 4 using the reader/writer 60 (step 1). The first controller C1 determines whether this ID information is the latest or not, that is whether the position correction data of the slider 4 has already been acquired (step S3). If the determination result is YES, the first controller C1 further reads the position correction data of the slider 4 using the reader/writer 60, and stores this position correction data in the data storage unit 74, so as to correspond with the ID information (step S5), and transmits the position correction data, along with the ID information, to the other controllers C2 to C32 via the LAN 62 (step S7). Then each controller C1 to C32 stores the arrangement sequence (insertion sequence) data of the slider 4 in the data storage unit 74 (step S9). If it is determined that the ID information is not the latest in the processing in step S3, on the other hand, the first controller C1 transmits only the ID information of the slider 4, which was read using the reader/writer 60, to the other controllers C2 to C32. Thereby the first controller C1 and the other controllers C2 to C32 update the arrangement sequence (insertion sequence) data of the slider 4 (step S9).

In this linear conveyor, during the initial installation, the sliders 4 are sequentially inserted into the conveyance path from the sending unit P1 of the second direction reversing unit 3B (see FIG. 1 and FIG. 8). Therefore each motor controller C is provided with the arrangement sequence of the sliders 4 circling the linear conveyor, and the position correction data of each slider 4 by the processing in steps S1 to S9. The processing in steps S1 to S9 is continuously executed even after the linear conveyor begins to operate. This means that even if a new slider 4 is additionally inserted into the conveyance path, each motor controller C owns the position correction data of the added slider 4 and the latest data on the arrangement sequence of the sliders 4 respectively.

Figure 11:
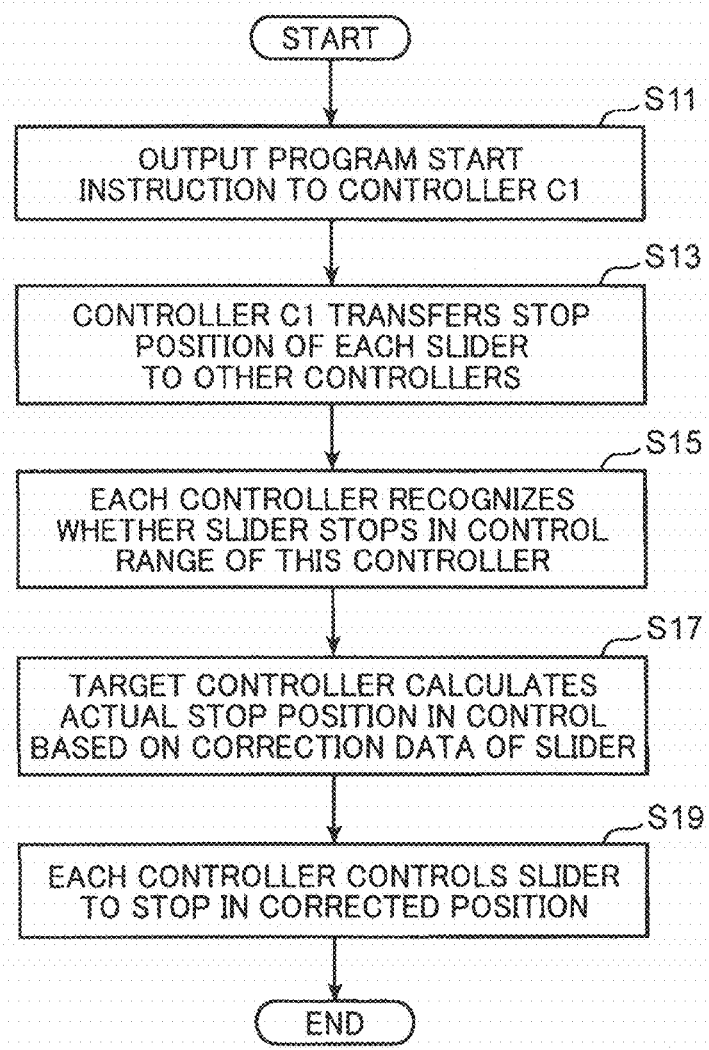
FIG. 11 is a flow chart depicting an example of controlling the slider in the linear conveyor.

Now the operation to control the linear motor by each motor controller C will be described according to the flow chart in FIG. 11.

First a program of the first controller C1 is started by a signal input from the PLC 65, whereby the first controller C1 determines the target stopping position of the slider 4 (step S11). The first controller C1 transfers this target stopping position data to the other controllers C2 to C32 via the LAN 62 (step S13).

Each motor controller C (main operation unit 72) recognizes whether the target stopping position belongs to the control section of this motor controller C, based on the target stopping data and known design data, that is, the total length (640 mm) of the unit member 20 and the length of one control section (160 mm) (step S15).

The motor controller C which recognized that the target stopping position belongs to the control section of this motor controller C specifies a slider 4 to stop at the target stopping position based on the stored data in the data storage unit 74, and corrects the target stopping position with reference to the position correction data (see FIG. 6) of the slider 4 (step S17). At this time, each motor controller C (main operation unit 72) refers to the arrangement stat of the sliders 4 on the conveyance path via the LAN 62, and specifies the control target slider 4 (slider 4 to stop at the target stopping position: hereafter called "target slider") based on the result of the reference, the ID information read by the reader/writer 60 (identification data which is read in step S1 in FIG. 10), and the arrangement sequence data stored in the data storage unit 74.

If the target stopping position is corrected like this, the motor controller C, which recognized that the target stopping position of the slider 4 belongs to the control section of this motor controller C, controls the supply of current to the electromagnet 26 based on the input signal from the sensor substrate 28 and the corrected target stopping position (step S19).

Figure 12:
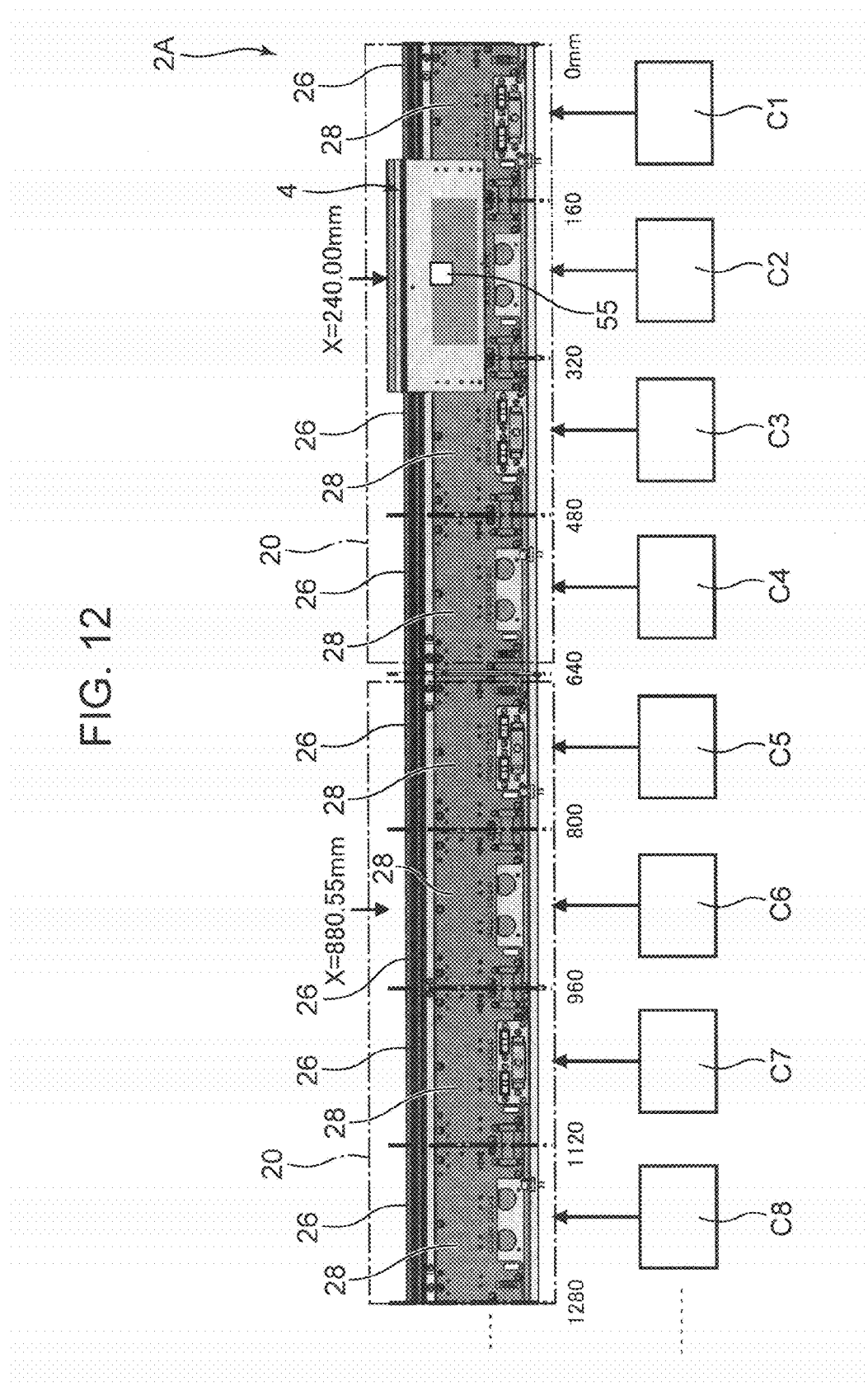
FIG. 12 is a front view depicting the linear conveyor for describing the example of controlling the slider.

The control operation in the above steps S11 to S19 will now be described in concrete terms. For example, as shown in FIG. 12, it is assumed that the target stopping position (X=880.55 mm) is determined for the slider 4 which is stopping at the position that is X=240 mm from the conveyance start point. In this case, the target stopping position belongs to the second control section, in order from the upstream side, of the second unit member 20, in order from the conveyance start point. Therefore the sixth controller C6, corresponding to this control section, recognizes that the target stopping position belongs to the control section of the sixth controller C6 (processing in steps S11 to S15).

The sixth controller C6 determines which control section thereof the target stopping position is located. In concrete terms, the sixth controller C6 determines the target stopping position in the control section thereof (80.55 mm) by dividing a distance from the conveyance start point to the target stopping position (X=880.55 mm) by a distance of one control section (160 mm). Then the sixth controller C6 adds an error of the target stopping position (e.g. −0.02 mm) in the position correction data of the target slider 4, and in this way corrects the target stopping position (80.53 mm=80.55+ (−0.02)) (processing in step S17).

Thereby the sixth controller C6 controls the supply of current to the electromagnet 26 based on the input signal from the sensor substrate 28 belonging to this control section and the corrected target stopping position (80.53 mm) (processing in step S19).

According to this linear conveyor, the linear conveyance units 2A and 2B are constituted by the plurality of unit members 20 which are linked, and the driving of the linear motor is controlled by an independent motor controller C for each subdivided control section, hence the degree of freedom to set the conveyance path length is high. Therefore in this linear conveyor, the conveyance path length can be freely set according to the intended use, and subsequent changes of the conveyance path length can be handled easily.

Further in this linear conveyor, the RF tag 55, which stores the position correction data to correct a unique movement error, is mounted on each slider 4, so that the position correction data is read by the reader/writer 60, and is transmitted to and stored in each motor controller C. When each slider 4 is driven, each motor controller C corrects the target stopping position first using the position correction data corresponding to the slider 4, then drives each slider 4. In other words, each motor controller C controls the supply of current to the electromagnet 26. As a consequence, even if the servo motor is controlled using a plurality of motor controllers C in this configuration, each slider 4 can be accurately positioned with considering the movement error unique to each slider 4.

Figure 13:
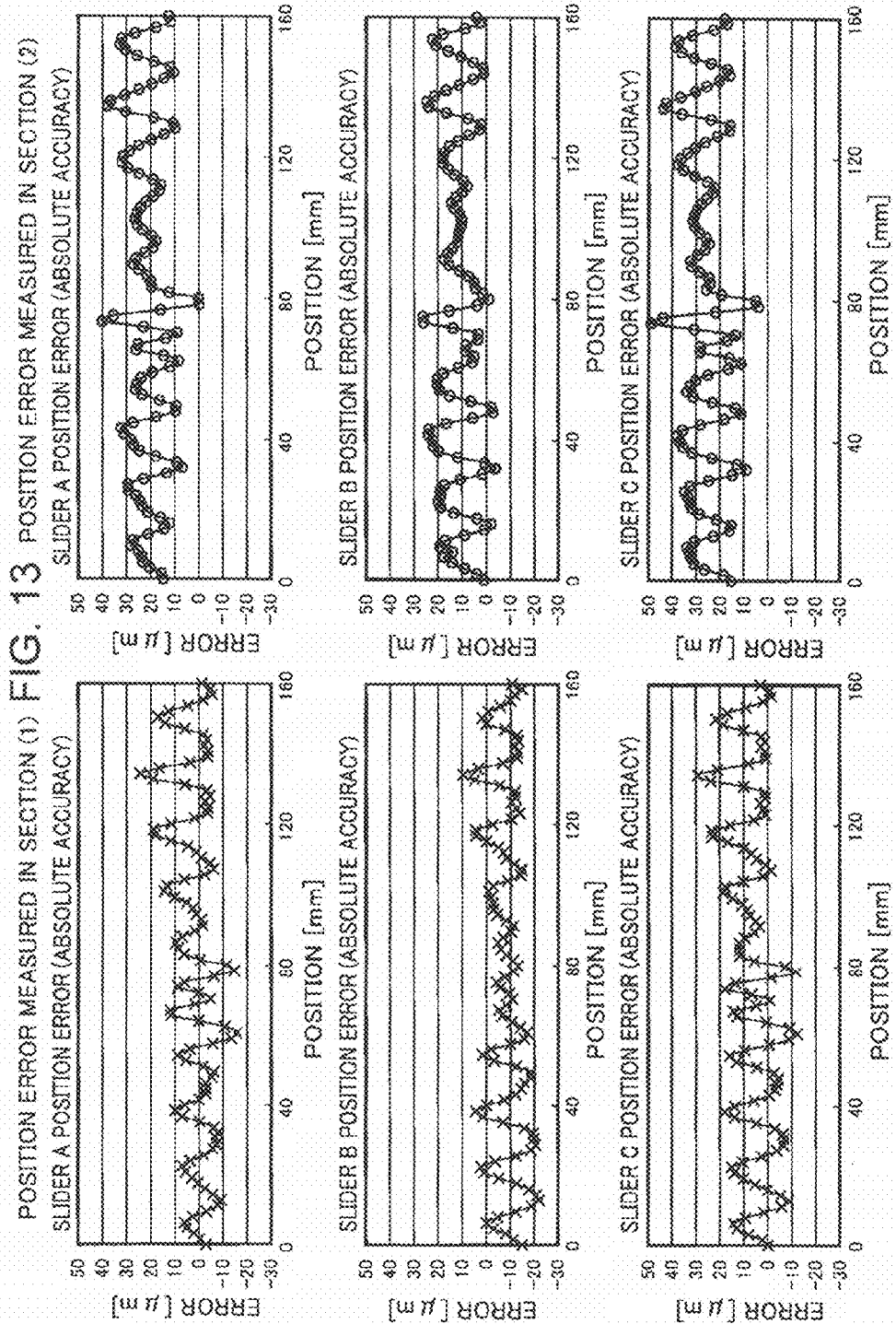
FIG. 13 is a set of diagrams (graphs) of a result of measuring the movement error between two different sections for a plurality of sliders.

In particular according to this linear conveyor, the movement error data of each slider 4 measured by the measurement jig in advance is the position correction data of each slider 4 of this linear conveyor, as mentioned above, and each motor controller C controls the supply of current in the control section which the respective motor controller C is in charge of using this common position correction data, hence the number of movement error data to be collected in advance can be decreased. In concrete terms, each slider 4 can be accurately positioned merely by collecting movement error data of the number that is the same as the number of sliders 4. To be precise, each slider 4 can be accurately positioned at a predetermined target stopping position with good repeatability. To further explain this aspect, in this linear motor, each motor controller C supplies current to the electromagnet 26 respectively, while recognizing the position of the slider 4 based on the signal input from the sensor substrate 28 in the control section that the respective motor controller C is in charge of. In this case, not only the slider 4 side but also the sensor substrate 28 side of the linear conveyance units 2A and 2B has individual differences (installation error and characteristic difference). Therefore as shown in FIG. 13, an actual position error of the slider 4, which is generated in each control section, is not always the same, but a different position error can be generated depending on the control section due to the influence of the individual difference in the sensor substrate 28 side (FIG. 13 shows an example when a movement error is measured for each of three sliders 4 (A to C) in two different control sections, and the left side shows measurement data in a specific section 1, and the right side shows measurement data in a specific section 2). In theory, for the position correction data for the sliders 4, independent position correction data must be prepared for each control section. In other words, it is necessary to collect movement error data of the number that is a same as a number generated by multiplying the number of control sections by the number of sliders 4, for example, and if there are 10 sliders 4 in this example where there are 32 control sections, then a total of 320 movement error data of the sliders 4 must be corrected.

Figure 14:
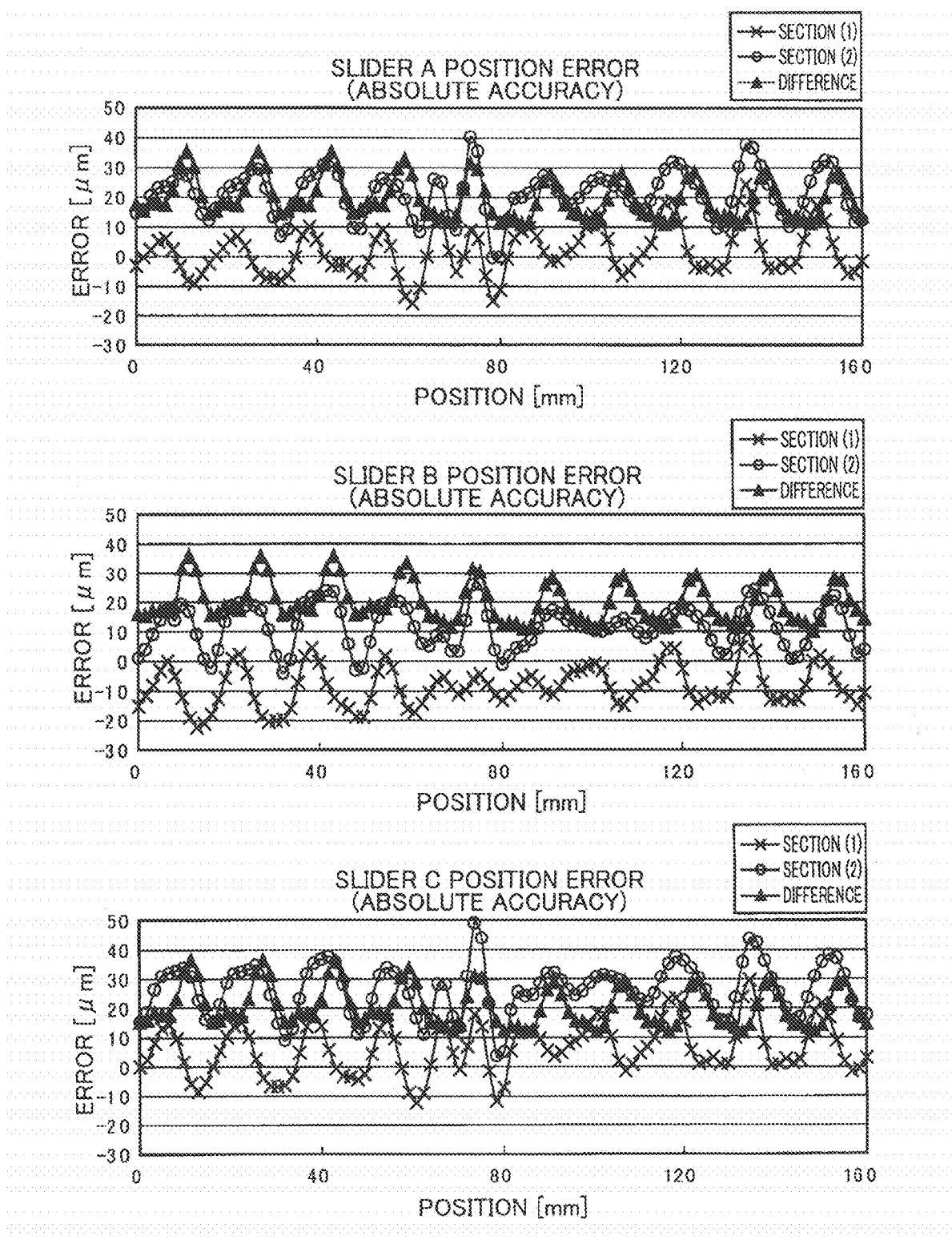
FIG. 14 is a set of diagrams (graphs) of a result of determining a difference of positional error data measured for different sections of the same slider.

However, if a difference of the position error data measured in different control sections of a slider 4 is determined for the position correction data (movement error data) shown in FIG. 13, the result is similar for all the sliders 4, as shown in FIG. 14. This means that if the sliders 4 are controlled on the linear conveyance units 2A and 2B using the movement error data (position correction data) of each slider 4 collected using a common measurement jig, the accuracy of the absolute position of each slider 4 in each control section is not always guaranteed, but movement errors among the sliders 4 can be cancelled. In other words, each slider 4 can be positioned at a specific position with good repeatability. Therefore, according to the linear conveyor, where each motor controller C controls the linear motor (linear motor stator 7) in the section that this motor controller C is in charge of, using common movement error data measured in advance as the position correction data of each slider 4 using the measurement jig, each slider 4 can be accurately positioned at a predetermined target stopping position with good repeatability, while decreasing the volume of movement error data to be collected in advance.

Figure 10:
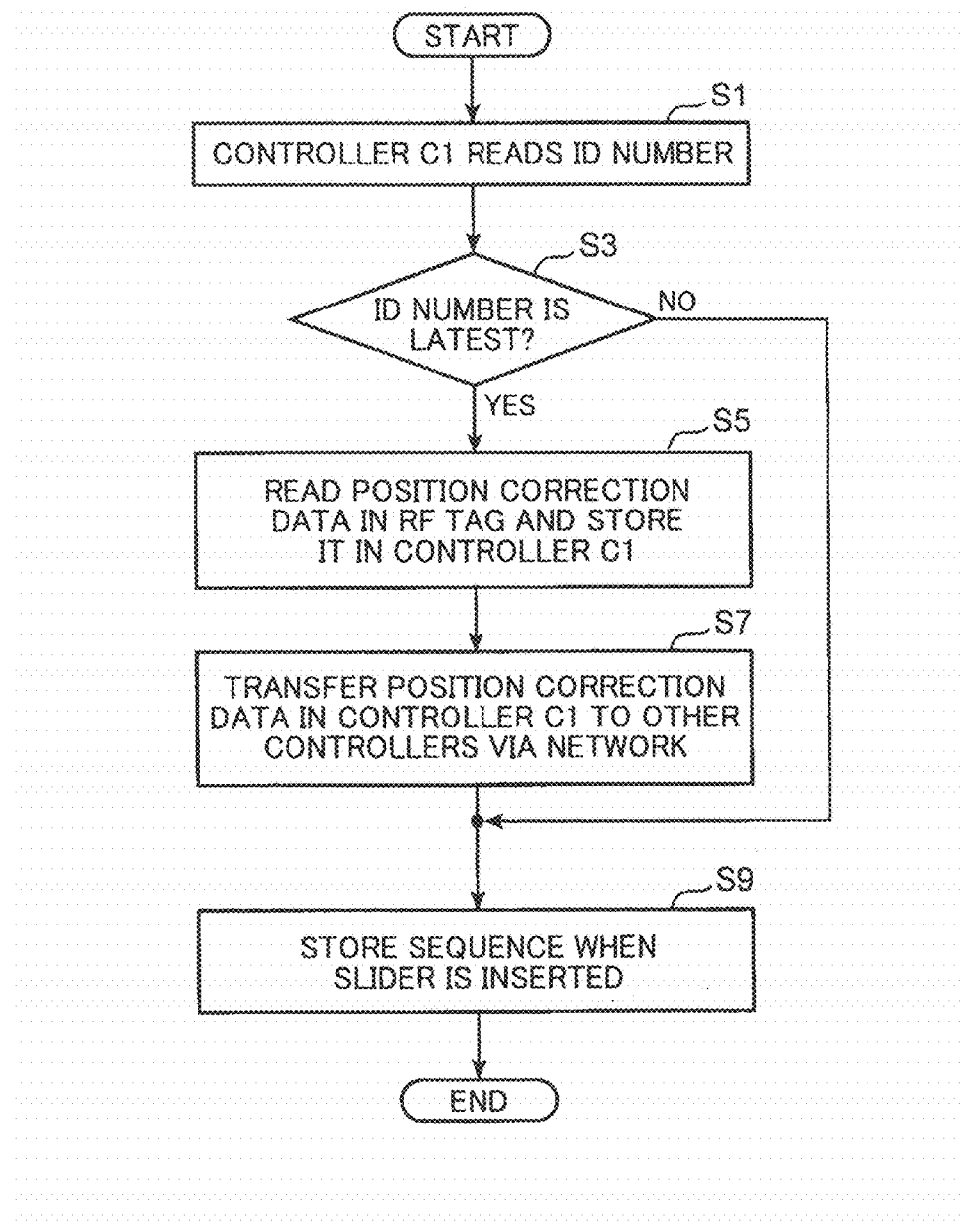
FIG. 10 is a flow chart depicting an example of reading and distribution processing of unique information.

Further, according to the configuration where each motor controller C controls a linear motor using the movement error data of each slider 4 measured by the measurement jig in advance as the common position correction data, even if a slider 4 is added later, the slider 4 can be accurately positioned at a predetermined target stopping position with good repeatability, just like conventional sliders 4. In other words, if the movement error of each slider 4 is measured using the measurement jig and if the position correction data (movement error data) is stored in the RF tag 55, then each slider 4 can be accurately positioned at a predetermined target stopping position with good repeatability merely by inserting each slider 4 into the linear conveyor. As a result, a slider 4 can be easily and quickly added to and operated in a linear conveyor which is already installed and operating in a factory or the like. Modification of control of linear motor In the above mentioned linear conveyor, each motor controller C stores the position correction data and the arrangement sequence data of each slider 4, but only the first controller C1 may store the position correction data and the arrangement sequence data of each slider 4. The control operation for the linear motor by each motor controller C in this case will now be described according to the flow chart in FIG. 15. As a premise, in the case of this control, the processing in step S7 of the flow chart in FIG. 10 is omitted.

First when a program of the first controller C1 is started by a signal input from the PLC 65, and the target stopping position is determined (step S21), the first controller C1 refers to the position correction data of the slider 4 based on the data stored in the data storage unit 74, and calculates the correction value of the target stopping position (step S23). Then the first controller C1 transfers the target stopping position data and the correction value data to the other controllers C2 to C32 via the LAN 62 (step S25).

Each motor controller C (main operation unit 72) recognizes whether the target stopping position belongs to the control section of this motor controller C, based on the target stopping position data (step S27), and if it is recognized that the target stopping position belongs to the control section of this motor controller C, this motor controller C corrects the target stopping position based on the correction value data (step S29).

Thereby the motor controller C which recognized that the target stopping position belongs to the control section of this motor controller C controls the supply of current to the electromagnet 26 based on the input signal from the sensor substrate 28 that belongs to this control section and the corrected target stopping position (step S31).

The control operation in the above steps S21 to S31 will now be described in concrete terms based on the example illustrated in FIG. 12.

First the first controller C1 determines the control section where the target stopping position is located. In concrete terms, the first controller C1 determines the target stopping position in the control section thereof (80.55 mm) by dividing a distance from the conveyance start point to the target stopping position (X=880.55 mm) by a distance of one control section (160 mm). Then the first controller C1 determines an error of the target stopping position, that is, a correction value (e.g. −0.02 mm) referring to the position correction data of the target slider 4, and transmits the target stopping position data (X=880.55 mm) and the correction value data (−0.02 mm) to each controller C2 to C32 (processing in steps S21 to S25). At this time, the first controller C1 (main operation unit 72) refers to the arrangement state of the sliders 4 on the conveyance path via the LAN 62, and specifies the target slider 4 based on this result, the ID information read by the reader/writer 60 (identification read in step S1 in FIG. 10), and the arrangement sequence data stored in the data storage unit 74.

Then each motor controller C determines whether the target stopping position belongs to the control section of this motor controller C (processing in step S27). In this case, the target stopping position (X=880.55 mm) belongs to the second control section, in order from the upstream side, of the second unit member 20, in order from the conveyance start point. Therefore, therefore the sixth controller C6 corresponding to this control section recognizes that the target stopping position belongs to the control section of the sixth controller C6. The sixth controller C6 also determines the target stopping position (80.55 mm) in the control section of the sixth controller C6 from the target stopping position data (X=880.55 mm), and corrects this target stopping position with the correction value data (−0.02 mm) (80.53 mm=80.55+(−0.02)) (processing in step S29).

Thereby the sixth controller C6 controls the supply of current to the electromagnet 26 based on the corrected target stopping position (80.53 mm) (processing in step S31).

Figure 15:
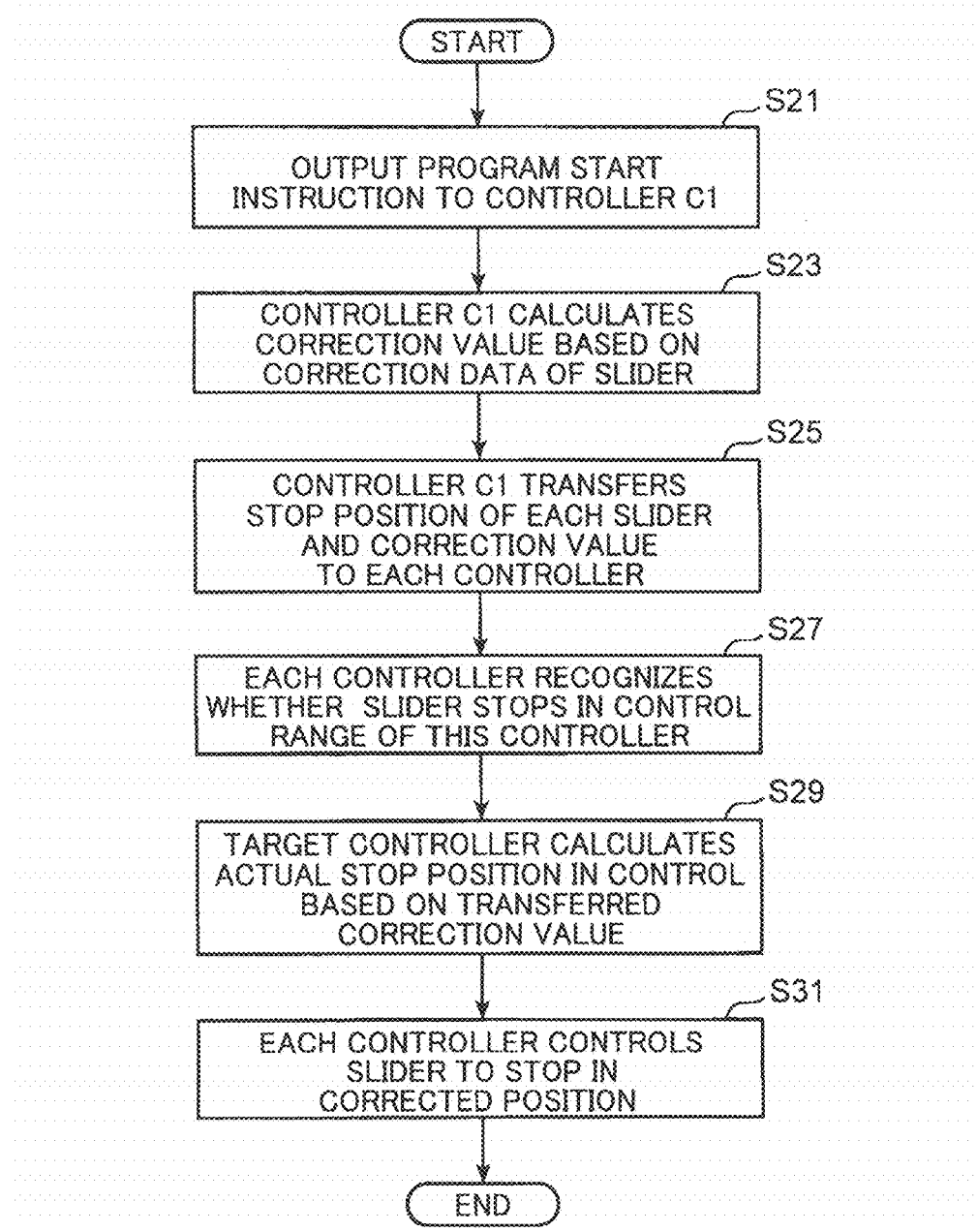
FIG. 15 is a flow chart depicting an example of controlling the slider in the linear conveyor.

According to the control shown in FIG. 15, compared with the case of each motor controller C storing the position correction data of all the sliders 4, storage capacity of the data storage unit 74 in the controls C2 to C32, other than the first controller C1, can be decreased, and the data volume to be transmitted via the LAN 62 can be decreased.

As another modification of the control shown in FIG. 15, the linear motor may be controlled according to the flow chart shown in FIG. 16. In this flow chart, the steps S24 and S26 are added instead of step S25 in FIG. 15, and step S29 in FIG. 15 is omitted. In other words, according to this flow chart, the first controller C1 determines a correction value in step S23. Then the first controller C1 corrects the target stopping position based on the correction value (step S24), and transfers the corrected target stopping position data to the other controllers C2 to C32 via the LAN 62 (step S26). Then each motor controller C recognizes whether the target stopping position belongs to the control section of this motor controller C, based on the corrected stopping position data (step S27). The motor controller C, which recognized that the target stopping position belongs to the control section of this motor controller C, controls the supply of current to the electromagnet 26 based on the target stopping position (step S31).

To explain further based on the example shown in FIG. 12, the first controller C1 determines an error of the target stopping position, that is, a correction value (e.g. −0.02 mm), then corrects the target stopping position (X=880.55 mm) with the correction value (−0.02 mm) (880.53 mm=880.55+(−0.02)) (processing in step S21 and S23).

Then the first controller C1 transfers the corrected target stopping position data (X'=880.53 mm) to the other controllers C2 to C32 (processing in step S26).

Each motor controller C determines whether the corrected target stopping position belongs to the control section of this motor controller C (processing in step S27). In this case, the target stopping position (X'=880.53 mm) belongs to the second control section, in order from the upstream side, of the second unit member 20, in order from the conveyance start point. Therefore, the sixth controller 6C corresponding to this control section recognizes that the target stopping position belongs to the control section of the sixth controller C6.

Thereby the sixth controller C6 determines the target stopping position (80.53 mm) in the control section thereof from the target stopping position data (X'=880.53 mm), and controls the supply of current to the electromagnet 26 based on this target stopping position (processing in step S31).

In the case of the control of the linear motor shown in the flow chart in FIG. 16 as well, functional effects similar to the control shown in the flow chart in FIG. 15 can be demonstrated.

In the above mentioned embodiments of the present disclosure, the step of measuring each movement error of each slider 4 using the measurement jig in FIG. 7 and acquiring the movement error data corresponds to the data acquisition step in the driving control method for a linear conveyor of the present disclosure, and each processing in FIG. 1 (steps S15 to S19), FIG. 15 (steps S27 to S31) and FIG. 16 (steps S27 and S31) correspond to the conveyance carriage driving step in this method.

The linear conveyor described above is an example of a preferred embodiment of the linear conveyor according to the present disclosure, and the concrete configuration thereof can be appropriately changed in a scope that does not depart from the true spirit of the disclosure.

For example, according to this embodiment (flow chart in FIG. 10), the position correction data of each slider 4 is read by the reader/writer 60 disposed in the conveyance start point of the linear conveyor, and each motor controller C stores this data, whereby each motor controller C corrects the target stopping position using the position correction data of each slider 4. However the reader/writer 60 may be disposed in each control section of the linear conveyance units 2A and 2B respectively, so that each motor controller C can read the position correction data of the target slider 4 directly via the reader/writer 60. According to this configuration, only if the target stopping position and the ID information of the slider 4 are provided, each motor controller C can directly specify the slider 4 and correct the target stopping position by the position correction data read from the RF tag 55 of the specified slider 4. Hence functional effects similar to the linear conveyor of the embodiment can be demonstrated. In this case however, many readers/writers 60 are required, so in terms of cost and maintenance, it is more advantageous that a common reader/writer 60 reads/writes the position correction data of each slider 4 as in the case of the above mentioned embodiment.

In the linear conveyor of this embodiment, the conveyance path is formed so that the slider 4 moves in a loop along the horizontal surface, but the conveyance path may be formed so that the slider 4 moves in a loop along the vertical surface. In other words, the first linear conveyance unit 2A and the second linear conveyance unit 2B may be disposed with a distance in the vertical direction, so that the direction reversing units 3A and 3B are constructed to move the sliders 4 in parallel vertically between the linear conveyance units 2A and 2B.

In the linear conveyor of this embodiment, the direction reversing units 3A and 3B are respectively disposed on both ends in the longitudinal direction of the two linear conveyance units 2A and 2B which are parallel to each other, but the linear conveyor may be constituted by one linear conveyance unit and a transporting unit, such as a belt conveyor, which allows a slider 4 that reached the end position of this linear conveyance unit to return to the start position. The transporting unit may be a direct driven type robot, for example.

In the linear conveyor of this embodiment, the slider 4 stores unique information using RF tags 55, and this information is read by a non-contact reader/writer 60, but a concrete configuration of the unit of storing the unique information on the slider 4 and the unit of reading the unique information from the storage unit are not limited to RF tags 55 and a reader/writer 60.

In the linear conveyor of this embodiment, the slider 4 moves in a loop along a circular conveyance path, but the conveyor path may be linear. In other words, a plurality of sliders 4 disposed on a linear conveyance path may move back and forth integrally in the same direction within a predetermined area assigned to each slider 4, or a plurality of sliders may individually move back and forth.

In this linear conveyor, a unit member 20 constituting each linear conveyance unit 2A and 2B includes four control sections (four electromagnets 26), but the number of control sections may be less than four or may be five or more.

In the linear conveyor of this embodiment, the magnetic linear scale is used as the linear scale, but the linear scale may be a linear scale other than a magnetic type, such as an optical linear scale.

In the linear conveyor of this embodiment, each linear conveyance unit 2A and 2B is constituted by a plurality of unit members 20 which are linked, but may be constituted by a single frame which is continuous throughout an entire longitudinal direction of the linear conveyance unit 2A (or 2B), and a plurality of electromagnets 26 and a plurality of sensor substrates 28 are arranged in a line and secured to this frame in this state.

The present disclosure described above is summarized as follows.

It is an object of the present disclosure to provide a linear conveyor where a linear motor stator is divided into a plurality of sections with each section individually controlled, and a conveyance carriage can be positioned accurately with a low data collection volume.

With the foregoing in view, the present applicant performed various examinations on a linear conveyor which includes a linear motor stator divided into a plurality of sections (e.g. unit members) and in which each section is individually controlled by repeatedly collecting the movement error of each conveyance carriage in each section. As a result, it was discovered that if a difference of the movement error data of a conveyance carriage, collected in two specific sections, is determined, the difference data is similar in all the conveyance carriages, and the present application paid attention to this aspect. This means that if the movement error data of each conveyance carriage collected in a specific section is used for another section, the accuracy of the absolute position of each conveyance carriage in this other section is not always guaranteed, but movement errors among the conveyance carriages can be cancelled. In other words, each conveyance carriage can be positioned at a same position with good repeatability.

The present disclosure was performed focusing on this aspect. In other words, a linear conveyor according to an aspect of the present disclosure has: a linear motor stator which includes a plurality of electromagnets arranged along a predetermined conveyance path, and in which each predetermined section can be individually controlled for conduction; a plurality of conveyance carriages each including a linear motor mover which is a permanent magnet and constitutes a linear motor in tandem with the linear motor stator, the conveyance carriages being movably disposed along the conveyance path; a linear scale which includes scale members secured to each of the conveyance carriages, and detectors disposed along the conveyance path so that the scale members can be detected; a plurality of motor controllers which are disposed in correspondence with the sections of the linear motor stator respectively, and individually controls conduction of the electromagnets for each section based on the results of detecting the scale member by the detector; and a data storage unit which stores position correction data for each conveyance carriage, which is data for correcting movement error unique to each conveyance carriage and is determined based on the movement error of each conveyance carriage measured in advance using a common measurement jig, wherein each of the plurality of motor controllers determines, as control data, either the position correction data stored in the data storage unit or processed data obtained through processing using the position correction data, and controls the conduction of the electromagnets using the control data so as to stop each conveyance carriage at a target stopping point.

According to this linear conveyor, each motor controller controls the conduction of the electromagnets in the respective section in charge using common position correction data (or data obtained through processing using the position correction data) stored in the data storage unit. Therefore data to be collected in advance, which is the movement error data of each conveyance carriage to be the source of the position correction data, can be data only for the number of conveyance carriages. Hence data collection volume is decreased. Further according to this linear conveyor, each conveyance carriage can be positioned in a same position with good repeatability, that is, each conveyance carriage can be positioned accurately.

In the linear conveyor according to this aspect, the data storage unit may be common for each motor controller so that each motor controller refers to the position correction data of each conveyance carriage of the data storage unit respectively. Further, each of the motor controllers may include the data storage unit, and each of the motor controllers may control the conduction of the electromagnets using the position correction data of the conveyance carriage to be controlled, out of the position correction data stored in the data storage unit of that motor controller.

In the linear conveyor according to this aspect, it is preferable that each of the plurality of conveyance carriages includes a storage medium storing the position correction data of that conveyance carriage, the linear conveyor further has a reading unit which can read the position correction data stored in the storage medium of each conveyance carriage, and the data storage unit stores the position correction data read by the reading unit.

According to this linear conveyor, the position correction data of each conveyance carriage is stored in the data storage unit by each reading unit reading the position correction data stored in the storage medium of each conveyance carriage. Therefore the operation for storing the position correction data of each conveyance carriage in the data storage unit can be automated.

The linear conveyor according to this aspect may further have a plurality of unit members each of which includes a rail member for forming the conveyance path, and the electromagnets arranged along the rail member respectively, wherein the conveyance path is formed by the rail members and the linear motor stator is formed of electromagnets by the unit members that are linked in series in the longitudinal direction of the rail members, and each of the motor controllers controls the conduction of the electromagnets included in each of the unit members as one section of the linear motor stator.

According to this linear conveyor, flexibility in the conveyance path length increases, and subsequent changes of the conveyance path length can be handled freely.

An aspect of the present disclosure is a conveyance carriage that constitutes a linear conveyor in tandem with a conveyor composing member by being installed in a rail member of the conveyor composing member that includes: the rail member which forms a conveyance path; a linear motor stator which includes a plurality of electromagnets arranged along the rail member and in which each predetermined section can be individually controlled for conduction; a detector disposed along the conveyance path so that a predetermined scale member is detected; a reading unit that reads data stored in a predetermined storage medium; and a plurality of motor controllers which are disposed in correspondence with the respective sections of the linear motor stator, and individually controls conduction of the electromagnets for each section based on control data, which is either the data read by the reading unit or data obtained through processing using the data and the result of detecting the scale member by the detector. The conveyance carriage including: a frame member which is movably installed in the rail member; a linear motor mover which is a permanent magnet secured to the frame member, and constitutes a linear motor in tandem with the linear motor stator; the scale member which is secured to a position, in the frame member, that can be detected by the detector, and which constitutes a linear scale in tandem with the detector; and the storage medium secured to the frame member, wherein the storage medium stores position correction data which is data for correcting movement error unique to the conveyance carriage and is determined based on movement error of the conveyance carriage measured in advance using a predetermined measurment jig.

According to this conveyance carriage, the conveyance carriage can be simply added to the linear conveyor (the conveyor carriage is installed on the rail member). Then this conveyance carriage can be operated at a positioning accuracy similar to that of the other conveyance carriages which have been used. In other words, if this conveyance carriage is added to the linear conveyor, the position correction data of this conveyance carriage stored in the storage medium is read by the reading unit, and is stored in the data storage unit. Therefore when the conveyance carriage is positioned, each motor controller controls the conduction of the electromagnets using the position correction data of this conveyance carriage stored in the data storage unit, whereby this conveyance carriage can be positioned at an accuracy similar to that of the other conveyance carriages.

An aspect of the present disclosure is a drive control method for a linear conveyor that includes: a linear motor stator which includes a plurality of electromagnets arranged along a predetermined conveyance path, and in which each predetermined section can be individually controlled for conduction; a plurality of conveyance carriages each including a linear motor mover which is a permanent magnet, and movably disposed along the conveyance path; and a linear scale which includes scale members secured to the conveyance carriages respectively, and detectors disposed so that the scale members can be detected. The drive control method comprising: a data acquisition step of measuring movement error unique to the respective conveyance carriage using a common measurement jig; and a conveyance carriage driving step of moving each of the conveyance carriages by individually controlling conduction of the electromagnets for each section based on the results of detecting the scale members by the detectors using motor controllers which are disposed in correspondence with the respective sections of the linear motor stator, wherein in the conveyor carriage driving step, either movement error data of the conveyance carriage to be controlled out of the movement error data acquired in the data acquisition step, or processed data obtained through processing using the movement error data is determined as control data, and the motor controller controls conduction of the electromagnets using the control data.

According to this driving control method, each motor controller controls the conduction of the electromagnets in the respective section in charge using common movement error data (or data obtained through processing using the movement error data) acquired in the data acquisition step. According to this driving control method, the movement error data to be collected in advance can be data only for the number of conveyance carriages, hence data collection volume is decreased. Further as mentioned above, each conveyance carriage can be positioned at the same position with good repeatability. That is, each conveyance carriage can be positioned accurately. Industrial Applicability As described above, the present disclosure relates to a linear conveyor that moves conveyance carriages using a linear motor, where a linear motor stator is divided into a plurality of sections, and each section is individually controlled for conduction by the motor controller so as to move the conveyance carriages, but the conveyance carriages can still be accurately positioned with low data collection volume. As a consequence, the present disclosure is useful for factory equipment where flexibility is demanded in the form (linear or circular) of the conveyance path of the work and the conveyor path length, or factory equipment where subsequent changes are demanded in the form of the conveyance path and the conveyance path length.

The invention claimed is:

1. A linear conveyor, comprising:
   a linear motor stator which includes a plurality of electromagnets arranged along a predetermined conveyance path, and in which each section of said predetermined conveyance path is individually controlled for conduction;
   a first conveyance carriage and a second conveyance carriage each including a linear motor mover which is a permanent magnet and constitutes a linear motor in tandem with a linear motor stator, the conveyance carriages being movably disposed along the conveyance path;
   a linear scale which includes scale members secured to each of the conveyance carriages, and detectors disposed along the conveyance path so that the scale members are detected;
   a plurality of motor controllers which are disposed in correspondence with the sections of the linear motor stator respectively, and individually control conduction of the electromagnets for each section based on the results of detecting the scale member by the detector;
   a first data storage unit which stores position correction data determined based on a movement error unique to the first conveyance carriage that occurs due to an assembly error of the first conveyance carriage including an installation position error of the scale member, the movement error of the first conveyance carriage being obtained by means of a measurement jig which includes a data acquisition stator having a configuration identical to the section of the linear motor stator, a data acquisition detector having a configuration identical to the detector, and which is used to control conduction of electromagnets of the data acquisition stator based on a detection result of the scale member obtained by the data acquisition detector to thereby move the first conveyance carriage along a conveyance path for the data acquisition stator and measure a position of the first conveyance carriage to obtain, based on a measurement result, the unique movement error of the first conveyance carriage, and
   a second data storage unit which stores position correction data determined based on a movement error unique to the second conveyance carriage that occurs due to an assembly error of the second conveyance carriage including an installation position error of the scale member, the movement error of the second conveyance carriage being obtained by using the measurement jig to control the conduction of the electromagnets of the data acquisition stator based on a detection result of the scale member obtained by the data acquisition detector to thereby move the second conveyance carriage along the conveyance path for the data acquisition stator and measure a position of the second conveyance carriage to obtain, based on a measurement result, the unique movement error of the second conveyance carriage, wherein
   each of the plurality of motor controllers determines, as control data, either the position correction data stored in the first data storage unit or processed data obtained through processing using the position correction data, and controls the conduction of the electromagnets using the control data, so as to stop the first conveyance carriage at a target stopping point, and determines, as control data, either the position correction data stored in the second data storage unit or processed data obtained through processing using the position correction data, and controls the conduction of the electromagnets using the control data, so as to stop the second conveyance carriage at a target stopping point.

2. The linear conveyor according to claim 1, wherein each of the motor controllers includes the first data storage unit and the second data storage unit, and each of the motor controllers controls the conduction of the electromagnets using the position correction data stored in the respective first and second data storage units.

3. The linear conveyor according to claim 1, wherein the first conveyance carriages includes a first storage medium storing the position correction data of the first conveyance carriage,
   the second conveyance carriage includes a second storage medium storing the position correction data of the second conveyance carriage,
   the linear conveyor further comprises a reading unit which reads the position correction data stored in the storage medium of each conveyance carriage,
   the first data storage unit stores the position correction data of the first storage medium read by the reading unit, and
   the second data storage unit stores the position correction data of the second storage medium read by the reading unit.

4. The linear conveyor according to claim 1, further comprising a plurality of unit members each of which includes a rail member for forming the conveyance path, and the electromagnets arranged along the rail member respectively, wherein
the conveyance path is formed by the rail members and the linear motor stator is formed of electromagnets by the unit members that are linked in series in the longitudinal direction of the rail members, and
each of the motor controllers controls the conduction of the electromagnets included in each of the unit members as one section of the linear motor stator.

5. A conveyance carriage that constitutes a linear conveyor in tandem with a conveyor composing member by being installed on a rail member of the conveyor composing member that includes: the rail member which forms a conveyance path; a linear motor stator which includes a plurality of electromagnets arranged along the rail member and in which each predetermined section is individually controlled for conduction; a detector disposed along the conveyance path so that a predetermined scale member is detected; a reading unit that reads data stored in a predetermined storage medium; and a plurality of motor controllers which are disposed in correspondence with the respective sections of the linear motor stator, and individually control conduction of the electromagnets for each section based on control data, which is either the data read by the reading unit or data obtained through processing using the data and the result of detecting the scale member by the detector, the conveyance carriage comprising:
a frame member which is movably installed on the rail member;
a linear motor mover which is a permanent magnet secured to the frame member, and constitutes a linear motor in tandem with the linear motor stator;
the scale member which is secured to a position, in the frame member, that is detected by the detector, and which constitutes a linear scale in tandem with the detector; and
the storage medium secured to the frame member, wherein
the storage medium stores position correction data determined based on a movement error unique to the conveyance carriage that occurs due to an assembly error of the conveyance carriage including an installation position error of the scale member, the movement error being obtained by means of a measurement jig which includes a data acquisition stator having a configuration identical to the section of the linear motor stator, a data acquisition detector having a configuration identical to the detector, and a position measuring device, and which is used to control conduction of electromagnets of the data acquisition stator based on a detection result of the scale member obtained by the data acquisition detector to thereby move the conveyance carriage along a conveyance path for the data acquisition stator and measure a position of the conveyance carriage to obtain, based on a measurement result, the unique movement error of the conveyance carriage.

6. A drive control method for a conveyance carriage of a linear conveyor that includes: a linear motor stator which includes a plurality of electromagnets arranged along a predetermined conveyance path, and in which each predetermined section is individually controlled for conduction; a first conveyance carriage and a second conveyance carriage each including a linear motor mover which is a permanent magnet, and movably disposed along the conveyance path; and a linear scale which includes scale members secured to the conveyance carriages respectively, and detectors disposed so that the scale members are detected, the drive control method comprising:
a first data acquisition step of using a measurement jig which includes a data acquisition stator having a configuration identical to the section of the linear motor stator, a data acquisition detector having a configuration identical to the detector, and a position measuring device, to control conduction of electromagnets of the data acquisition stator based on a detection result of the scale member obtained by the data acquisition detector to thereby move the first conveyance carriage along a conveyance path for the data acquisition stator and measure a position of the first conveyance carriage to obtain, based on a measurement result, a movement error unique to the first conveyance carriage that occurs due to an assembly error of the first conveyance carriage including an installation position error of the scale member;
a second data acquisition step of using the measurement jig to control the conduction of the electromagnets of the data acquisition stator based on a detection result of the scale member obtained by the data acquisition detector to thereby move the second conveyance carriage along the conveyance path for the data acquisition stator and measure a position of the second conveyance carriage to obtain, based on a measurement result, a movement error unique to the second conveyance carriage that occurs due to an assembly error of the second conveyance carriage including an installation position error of the scale member; and
a conveyance carriage moving step of moving, in the linear conveyor, each of the conveyance carriages by individually controlling conduction of the electromagnets for each section based on results of detecting the scale members by the detectors using motor controllers which are disposed in correspondence with the respective sections of the linear motor stator, wherein
the conveyance carriage moving step includes:
a first conveyance carriage moving step of determining either the movement error data acquired in the first data acquisition step or processed data obtained through processing using the movement error data as control data, and causing the motor controller to control conduction of the electromagnets using the control data to thereby move the first conveyance carriage; and
a second conveyance carriage moving step of determining either the movement error data acquired in the second data acquisition step or processed data obtained through processing using the movement error data as control data, and causing the motor controller to control conduction of the electromagnets using the control data to thereby move the second conveyance carriage.

* * * * *